United States Patent
Tarragó Clua et al.

(10) Patent No.: US 12,459,891 B2
(45) Date of Patent: Nov. 4, 2025

(54) 1-[1-(4-BENZYLOXY-3,5-DIFLUORO-BENZOYL)-4-FLUORO-PYRROLIDINE-2-CARBONYL]-PYRROLIDINE-2-CARBONITRILE

(71) Applicant: ACCURE THERAPEUTICS, S.L., Barcelona (ES)

(72) Inventors: Teresa Tarragó Clua, Barcelona (ES); Roger Prades Cosano, Barcelona (ES)

(73) Assignee: Accure Therapeutics, S.L., Barcelona (ES)

(*) Notice: Subject to any disclaimer, the term of this patent is extended or adjusted under 35 U.S.C. 154(b) by 503 days.

(21) Appl. No.: 18/004,658

(22) PCT Filed: Jul. 6, 2021

(86) PCT No.: PCT/EP2021/068577
§ 371 (c)(1),
(2) Date: Jan. 6, 2023

(87) PCT Pub. No.: WO2022/008477
PCT Pub. Date: Jan. 13, 2022

(65) Prior Publication Data
US 2023/0250058 A1 Aug. 10, 2023

(30) Foreign Application Priority Data

Jul. 7, 2020 (EP) .................................... 20382606

(51) Int. Cl.
*C07D 207/16* (2006.01)
*A61P 25/28* (2006.01)

(52) U.S. Cl.
CPC ............ *C07D 207/16* (2013.01); *A61P 25/28* (2018.01)

(58) Field of Classification Search
CPC .......................... C07D 207/16; A61K 31/4025
See application file for complete search history.

(56) References Cited

U.S. PATENT DOCUMENTS

| 6,159,938 A | 12/2000 | Gyorkos et al. |
| 2006/0100253 A1 | 5/2006 | Niestroj et al. |

FOREIGN PATENT DOCUMENTS

| DE | 19603510 A1 | 8/1997 |
| JP | 2011-037874 A | 2/2011 |
| RU | 2018116882 A | 11/2019 |
| WO | WO 2003/004468 A1 | 1/2003 |
| WO | WO 2004/060862 A2 | 7/2004 |
| WO | WO 2005/002624 A1 | 1/2005 |
| WO | WO 2005/027934 A1 | 3/2005 |
| WO | WO 2008/077978 A1 | 7/2008 |
| WO | WO 2014/072498 A1 | 5/2014 |

OTHER PUBLICATIONS

"1-(3-Fluoro-4-methoxybenzoyl)-4-phenoxy-2-(pyrrolidine-1-carbonyl)pyrrolidine", PubChem, CID 110198463, Dec. 14, 2024, in 9 pages.
Bardgett et al., "NMDA receptor blockade and hippocampal neuronal loss impair fear conditioning and position habit reversal in C57B1/6 mice", Brain Research Bulletin, 2003, vol. 60, pp. 131-142.
Bennett, M.C. "The role of α-synuclein in neurodegenerative diseases", Pharmacology & Therapeutics, 2005, vol. 105, pp. 311-331.
Boess et al., "The Novel α7 Nicotinic Acetylcholine Receptor Agonist N-[3R)-1-Azabicyclo[2.2.2]oct-3-yl]-7-[2-(methoxy)phenyl]-1-benzofuran-2-carboxamide Improves Working and Recognition Memory in Rodents", The Journal of Pharmacology and Experimental Therapeutics, 2007, 321(2): 716-725.
Boess et al., "Inhibition of phosphodiesterase 2 increases neuronal cGMP, synaptic plasticity and memory performance", Nueropharmacology, 2004, vol. 47, pp. 1081-1092.
Brandt et al., "Peptide-based multi-agonists: a new paradigm in metabolic pharmacology", Journal of Internal Medicine, 2018, vol. 284, pp. 581-602.
Castellano et al., "NMDA Receptors and Learning and Memory Processes", Current Drug Targets, 2001, vol. 2, pp. 273-283.
Cheng et al., "How can the mood stabilizer VPA limit both mania and depression?" Molecular and Cellular Neuroscience, 2005, vol. 29, pp. 155-161.
D'Hooge et al., "Applications of the Morris water maze in the study of learning and memory", Brain Research Reviews, 2001, vol. 36, pp. 60-90.

(Continued)

*Primary Examiner* — Sahar Javanmard
(74) *Attorney, Agent, or Firm* — Knobbe, Martens, Olson & Bear, LLP

(57) ABSTRACT

The present invention relates to 1-[1-(4-benzyloxy-3,5-difluoro-benzoyl)-4-fluoro-pyrrolidine-2-carbonyl]-pyrrolidine-2-carbonitrile derivatives having pharmacological activity (I)

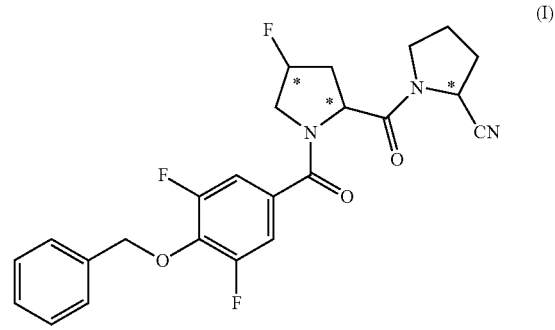

to processes of preparation of such compounds, to pharmaceutical compositions comprising them, and to their use in therapy and/or prophylaxis of a cognitive disorder.

8 Claims, 8 Drawing Sheets

(56) References Cited

OTHER PUBLICATIONS

Dere et al., "The pharmacology, neuroanatomy and neurogenetics of one-trial object recognition in rodents", Neuroscience and Biobehavioral Reviews, 2007, vol. 31, pp. 673-704.
Di et al., "High throughput artificial membrane permeability assay for blood-brain barrier", European Journal of Medicinal Chemistry, 2003, vol. 38, pp. 223-232.
Ennaceur et al., "A new one-trial test for neurobiological studies of memory in rats. 1: Behavioral data", Behavioural Brain Research, 1988, vol. 31, pp. 47-59.
Gosavi et al., "Golgi Fragmentation Occurs in the Cells with Prefibrillar α-Synuclein Aggregates and Precedes the Formation of Fibrillar Inclusion", The Journal of Biological Chemistry, 2002, 277(50): 48984-48992.
Hirsch et al., "Neuroinflammation in Parkinson's disease: a target for neuroprotection?" Lancet Neurol., 2009, vol. 8, pp. 382-397.
Hsu et al., "α-Synuclein Promotes Mitochondrial Deficit and Oxidative Stress", American Journal of Pathology, 2000, 157(2): 401-410.
International Search Report issued in International Application No. PCT/EP2021/068557, mailed on Sep. 21, 2021.
Kansy et al., "High-Throughput Artificial Membrane Permeability Studies in Early Lead Discovery and Development", Pharmacokinetic Optimization in Drug Research, 2001, pp. 447-464.
Kansy et al., "Physiochemical High Throughput Screening: Parallel Artificial Membrane Permeation Assay in the Description of Passive Absorption Processes", 1998, Journal of Medicinal Chemistry, 41(7): 1007-1010.
Kato et al., "Prevention of Amyloid-Like Deposition by a Selective Prolyl Endopeptidase Inhibitor, Y-29794, in Senescence-Accelerated Mouse", The Journal of Pharmacology and Experimental Therapeutics, 1997, 283(1): 328-335.
Katsube et al., "ONO-1603, a Potential Antidementia Drug, Delays Age-Induced Apoptosis and Suppresses Overexpression of Glyceraldehyde-3-Phosphate Dehydrogenase in Cultured Central Nervous System Neurons", The Journal of Pharmacology and Experimental Therapeutics, 1999, 288(1): 6-13.
Klegeris et al., "α-Synuclein activates stress signaling protein kinases in THP-1 cells and microglia", Neurobiology of Aging, 2008, vol. 29, pp. 739-752.
Komatsu et al., "$GABA_B$ Receptors, Monoamine Receptors, and Postsynaptic Inositol Trisphosphate-Induced $Ca^{2+}$ Release Are Involved in the Induction of Long-Term Potentiation at Visual Cortical Inhibitory Synapses", J. Neurosci., 1996, 16(20): 6342-6352.
Kowall et al., "An in vivo model for the neurodegenerative effects of β amyloid and protection by substance P", Proc. Natl. Acad. Sci. USA, 1991, vol. 88, pp. 7247-7251.
Madder et al., "A Novel Sensitive Colorimetric Assay for Visual Detection of Solid-Phase Bound Amines", Eur. J. Org. Chem., 1999, pp. 2787-2791.
Mantle et al., "Comparison of proline endopeptidase activity in brain tissue from normal cases and cases with Alzheimer's disease, Lewy body dementia, Parkinson's disease and Huntington's disease", Clinica Chimica Acta, 1996, vol. 249, pp. 129-139.
Marighetto et al., "Further Evidence for a Dissociation Between Different Forms of Mnemonic Expressions in a Mouse Model of Age-related Cognitive Decline: Effects of Tacrine and S 17092, a Novel Prolyl Endopeptidase Inhibitor", Learning & Memory, 2000, vol. 7, pp. 159-169.
Masliah et al., Dopaminergic Loss and Inclusion Body Formation in α-Synuclein Mice: Implications for Neurodegenerative Disorders', Science, 2000, vol. 287, pp. 1265-1269.
Morain et al., "Pharmacodynamic and pharmacokinetic profile of S 17092, a new orally active prolyl endopeptidase inhibitor, in elderly healthy volunteers. A phase I study", Br. J. Clin. Pharmacol., 2000, vol. 50, pp. 350-359.
Morain et al., "S 17092: A Prolyl Endopeptidase Inhibitor as a Potential Therapeutic Drug for Memory Impairment. Preclinical and Clinical Studies", CNS Drug Reviews, 2002, 8(1): 31-52.

Morain et al., "Psychotropic Profile of S 17092, a Prolyl Endopeptidase Inhibitor, Using Quantitative EEG in Young Healthy Volunteers", Neuropsychobiology, 2007, vol. 55, pp. 176-183.
Mutlu et al., "Effects of olanzapine, sertindole, and clozapine on MK-801 induced visual memory deficits in mice", Pharmacology, Biochemistry and Behavior, 2011, vol. 99, pp. 557-565.
Myöhänen et al., "A prolyl oligopeptidase inhibitor, KYP-2047, reduces β-synuclein protein levels and aggregates in cellular and animal models of Parkinson's disease", British Journal of Pharmacology, 2012, vol. 166, pp. 1097-1113.
Nolte et al., "Peptidomics of Prolyl Endopeptidase in the Central Nervous System", Biochemistry, 2009, vol. 48, pp. 11971-11981.
O'Leary et al., "Thyrotropin-Releasing Hormone", Journal of Neurochemistry, 1995, pp. 953-963.
Park et al., "Subchronic administration of rosmarinic acid, a natural prolyl oligopeptidase inhibitor, enhances cognitive performances", Fitoterapia, 2010, vol. 81, pp. 644-648.
Philips et al., "Neuroinflammation in amyotrophic lateral sclerosis: role of glial activation in motor neuron disease", Lancet Neurol., 2011, vol. 10, pp. 253-263.
Polymeropoulos et al., "Mutation in the α-Synuclein Gene Identified in Families with Parkinson's Disease", Science, 1997, vol. 276, pp. 2045-2047.
Riedel et al., "Glutamate receptor function in learning and memory", Behavioural Brain Research, 2003, vol. 140, pp. 1-47.
Rossner et al., "Brain Prolyl Endopeptidase Expression in Aging, APP Transgenic Mice and Alzheimer's Disease", Neurochemical Research, 30(6/7): 695-702.
Sarter et al., "Behavioral screening for cognition enhancers: from indiscriminate to valid testing: Part I", Psychopharmacology, 1992, vol. 107, pp. 144-159.
Schneider et al., "Effects of the Prolyl Endopeptidase Inhibitor S 17092 on Cognitive Deficits in Chronic Low Dose MPTP-Treated Monkeys", Neuropsychopharmacology, 2002, 26(2): 176-182.
Schulz et al., "Modulation of inositol 1,4,5-triphosphate concentration by prolyl endopeptidase inhibition", Eur. J. Biochem., 2002, vol. 269, pp. 5813-5820.
Shinoda et al., "Pharmacological studies of a novel prolyl endopeptidase inhibitor, JTP-4819, in rats with middle cerebral artery occlusion", European Journal of Pharmacology, 1996, vol. 305, pp. 31-38.
Spowart-Manning et al., "The T-maze continuous alternation task for assessing the effects of putative cognition enhancers in the mouse", Behavioural Brain Research, 2004, vol. 151, pp. 37-46.
Svarcbahs et al., "Prolyl oligopeptidase inhibition activates autophagy via protein phosphatase 2A", Pharmacological Research, 2020, vol. 151, in 16 pages.
Tarrago et al., "Identification by $^{19}F$ NMR of Traditional Chinese Medicinal Plants Possessing Prolyl Oligopeptidase Inhibitory Activity", ChemBioChem, 2006, vol. 7, pp. 827-833.
Tenorio-Laranga et al., "Prolyl oligopeptidase is inhibited relapsing-remitting multiple sclerosis", Journal of Inflammation, 2010, 7(23): 1-8.
Toide et al., "JTP-4819: A Novel Prolyl Endopeptidase Inhibitor with Potential as a Cognitive Enhancer", The Journal of Pharmacology and Experimental Therapeutics, 1995, 274(8): 1370-1378.
Toide et al., "Effect of a Novel Prolyl Endopeptidase Inhibitor, JTP-4819, on Spatial Memory and Central Cholinergic Neurons in Aged Rats", Pharmacology Biochemistry and Behavior, 1997, 56(3): 427-434.
Toide et al., "A Novel Prolyl Endopeptidase Inhibitor, JTP-4819 Its Behavioral and Neurochemical Properties for the Treatment of Alzheimer's Disease", Reviews in the Neurosciences, 1998, vol. 9, pp. 17-29.
Uphouse, L. "Pharmacology of serotonin and female sexual behavior", Pharmacology, Biochemistry, and Behavior, 2014, vol. 121, pp. 31-42.
Van der Staay et al., "Effects of the cognition impairer MK-801 on learning and memory in mice and rats", Behavioural Brain Research, 2011, vol. 220, pp. 215-229.
Wilk, S. "Neuropeptide Specific Peptidases: Does Brain Contain a Specific TRH-Degrading Enzyme?" Life Sciences, 1983, vol. 39, pp. 1487-1492.

(56) References Cited

OTHER PUBLICATIONS

Williams et al., "Loss of a prolyl oligopeptidase confers resistance to lithium by elevation of inositol (1,4,5) trisphosphate", The EMBO Journal, 1999, 18(10): 2734-2745.

Yang et al., "Ac-SDKP Reverses Inflammation and Fibrosis in Rath With Heart Failure After Myocardial Infarction", Hypertension, 2004, pp. 229-236.

Yoshimoto et al., "Specific Inhibitors for Prolyl Endopeptidase and their Anti-Amnesic Effect", J. Pharmacobio-Dyn., 1987, vol. 10, pp. 730-735.

Zarranz et al., "The New Mutation, E46K, of α-Synuclein Causes Parkinson and Lewy Body Dementia", Ann. Neurol., 2004, vol. 55, pp. 164-173.

Zhao et al., "Evaluation of Human Intestinal Absorption Data and Subsequent Derivation of a Quantitative Structure-Activity Relationship (QSAR) with the Abraham Descriptors", Journal of Pharmaceutical Sciences, 2001, 90(6): 749-784.

1-[1-(4-BENZYLOXY-3,5-DIFLUORO-BENZOYL)-4-FLUORO-PYRROLIDINE-2-CARBONYL]-PYRROLIDINE-2-CARBONITRILE

FIELD OF THE INVENTION

The present invention relates to compounds having pharmacological activity, and more particularly to 1-[1-(4-benzyloxy-3,5-difluoro-benzoyl)-4-fluoro-pyrrolidine-2-carbonyl]-pyrrolidine-2-carbonitrile, its stereoisomers and salts thereof, to processes of preparation of such compounds, to pharmaceutical compositions comprising them, and to their use in therapy and/or prophylaxis of neurodegenerative disorders and/or cognitive impairment.

BACKGROUND

Prolyl oligopeptidase (EC 3.4.21.26) (POP), also known as prolyl endopeptidase (PREP), is a serine protease that catalyses the hydrolysis of peptides at the C-terminal side of L-proline residues. It is widely distributed in mammals and can be purified from various organs, including the brain.

The enzyme plays an important role in the breakdown of proline-containing neuropeptides related to learning and memory functions (Wilk S et al., Life Sci. 1983; 33:2149-57; O'Leary R M, O'Connor B, J. Neurochem. 1995; 65:953-63).

The effects of prolyl oligopeptidase inhibition has been tested in the treatment of cognitive deficits related to neurodegenerative processes. Parkinson's disease was generated in monkeys by treatment with 1-methyl-4-phenyl-1,2,3,6-tetrahydropyridine (MPTP), a neurotoxin that produces depletion of substance P. Subsequent treatment with S-17092, a potent POP inhibitor, increased the performance of cognitive tasks (Schneider J S et al., Neuropsychopharmacology 2002; 26(2):176-82). It has also been found that POP inhibition prevents the oligomerization of α-synuclein ex vivo (Myöhänen T T et al., Br. J. Pharmacol. 2012; 166(3):1097-113). In the case of Alzheimer's disease (AD), several in vivo experiments in animal models showed that POP inhibition led to neuroprotective and cognition-enhancing effects (Kato A et al., J. Pharmacol. Exp. Ther. 1997; 283(1):328-35 and Toide K et al., Rev. Neurosci. 1998; 9(1):17-29). Neuroprotective effects were originally observed by Katsube's group, when cortical and cerebellar granule cells were prevented from age-induced apoptosis by treatment with the POP inhibitor ONO-1603 (Katsube N et al., J. Pharmacol. Exp. Ther. 1999; 288(1):6-13).

Clinical trials with POP inhibitors in the treatment of cognitive deficits have been performed only in a few cases. In a phase I clinical study Morain's group (Morain P et al., Br. J. Clin. Pharmacol. 2000; 50(4):350-9) found that the above-mentioned S-17092 prolyl endopeptidase inhibitor has cognition-enhancing properties in healthy elderly subjects and a clear dose-dependency; moreover, no adverse effects were detected. Later studies suggested additional slight mood-stabilizing properties for this compound (Morain P et al., Neuropsychobiology 2007; 55(3-4):176-83).

Prolyl oligopeptidase activity has been reported to be altered (post-mortem) in several neurodegenerative diseases, including Alzheimer's disease (AD), Parkinson's disease, Huntington's disease and multiple sclerosis (MS) (Mantle D et al., Clin. Chim. Acta 1996; 249(1-2):129-39).

There is also a substantial amount of evidence pointing to a role for neuroinflammation in the pathogenesis of neurodegenerative diseases such as AD, MS and Parkinson's disease (Hirsch E C et al., Lancet Neurol. 2009; 8(4):382-97, Philips T et al., Lancet Neurol. 2011; 10(3):253-63). POP has been considered to be the main enzyme implicated in the release of an anti-inflammatory tetrapeptide Ac-SDKP from Tβ4 in the brain (Yang F et al., Hypertension 2004; 43(2):229-36, Nolte W M et al., Biochemistry 2009; 48(50):11971-81). This suggests that the inhibition of POP may help reduce neuroinflammation and consequently POP inhibitors may be useful in the treatment of neurodegenerative diseases with an inflammatory component such as Alzheimer's and Parkinson's disease and in particular help improve the cognitive disorders associated with these diseases.

Senile plaques spreading over the cortical brain areas are typical neuropathological hallmarks of AD. The main protein component of these plaques is amyloid β-peptide (Aβ). Deposition of Aβ triggers neuronal dysfunction and death in the brain. This peptide derives from the β-amyloid precursor protein (APP). Under normal conditions, APP is cleaved by α-secretase to generate soluble APPα which precludes Aβ generation.

Interestingly, POP inhibition increases intracellular IP3 levels, which may contribute to the stimulation of APPα production, which would in turn decrease Aβ generation.

Additionally, Rossner (Rossner S et al., Neurochem. Res. 2005; 30(6-7):695-702) found less POP immunoreactive neurons in brain structures of AD patients affected by Aβ plaques.

Additionally, it seems that substance P can suppress neurotoxic action of β-amyloid protein (Kowall N W et al., Proc. Natl. Acad. Sci. USA 1991; 88(16):7247-51). Prolyl oligopeptidase inhibitors inhibit the metabolism of substance P helping to sustain levels of substance P that may suppress the neurotoxic action of β-amyloid protein.

In view of the above-mentioned effects, it is thought that prolyl oligopeptidase inhibitors may be useful drugs for the treatment of Alzheimer's disease helping to prevent brain damage and to improve the cognitive disorders associated with the disease.

Prolyl oligopeptidase has also been associated with several factors that might be relevant to multiple sclerosis (MS). For instance, POP is involved in the regulation of microglia toxicity (Klegeris A et al., Glia 2008; 56(6):675-85). Indeed, a direct connection between POP and MS has been established; the plasma POP activities of patients with Relapsing-Remitting-MS (RR-MS) were significantly reduced (Tenorio-Laranga J et al., J Neuroinflammation 2010; 7:23). Interestingly, the reduction correlated with the severity of disease symptoms, but not with patient age. Instead, an inverse correlation between POP activity and age was observed in healthy controls, and in elderly controls the levels were comparable to those found in MS patients.

The neuropathological hallmark of Parkinson's disease is the progressive degeneration of melanised dopaminergic neurons in substantia nigra pars compacta together with intracellular inclusions known as Lewy bodies. A major component of the Lewy bodies is a 140 amino acid protein, α-synuclein. Under certain conditions, α-synuclein monomers interact to form prefibrillar aggregates or protofibrils, which can create cytotoxic insoluble fibrils. These fibrils cannot be degraded by the proteasome, and they impair the function of this intracellular proteolytic system. This leads to an accumulation of α-synuclein protofibrils (and other proteins that are degraded by the proteasome) in the cytosol (Bennett M C, Pharmacol. Ther. 2005; 105(3):311-31) and as a consequence, α-synuclein protofibrils are increased in brains of Parkinson's disease patients. These fibrils have been associated with neurotoxicity in α-synuclein overexpressing cells and mouse models (Masliah E et al., Science 2000; 287(5456):1265-9; Gosavi N et al., J. Biol. Chem. 2002; 277(50):48984-92). Abnormal accumulation of misfolded α-synuclein may lead to mitochondrial changes which can promote oxidative stress and evoke cell death (Hsu L J et al., *Am. J. Pathol.* 2000; 157(2):401-10). Furthermore, three point mutations (A53T, A30P or E46K) in the α-synuclein gene are known to be involved in the pathogenesis of familial form of Parkinson's disease (Polymeropoulos M H et al., *Science* 1997; 276(5321):2045-7; Zarranz J J et al., *Ann. Neurol.* 2004; 55(2):164-73).

It has been shown in vitro that the aggregation rate of α-synuclein was enhanced when the protein was incubated with a clone of wild-type porcine POP, and this enhancement depended upon the POP concentration (Brandt I et al., *Peptides* 2008; 29(9):1472-8). Moreover, a mutated variant without POP activity (S544A) did not accelerate the aggregation rate.

Enhanced aggregation could also be prevented by the addition of POP inhibitors, suggesting that the effect was dependent on the POP enzymatic activity. Experimental data suggests that POP inhibitors can block the increased α-synuclein aggregation induced by oxidative stress in human α-synuclein overexpressing neuroblastoma SH-SY5Y cells (Myöhänen T T et al., *Br. J. Pharmacol.* 2012; 166(3):1097-113). POP colocalizes with α-synuclein in SH-SY5Y cells, and this colocalization disappears after incubation with POP inhibitors, pointing to an interaction between POP and α-synuclein. A 5-day treatment with a POP inhibitor reduced the amount of soluble α-synuclein in the brains of a A30P α-synuclein transgenic mice. In this regard, POP inhibitors have been reported to enhance α-synuclein clearance by modulating autophagy (Myöhänen T T et al., Pharmacological Research 2020; 151:104558).

Thus, inhibition of brain POP activity could prevent α-synuclein aggregation and thus, prevent the formation of the cytotoxic protofibrils present in the Lewy bodies. Therefore, POP inhibitors could potentially have therapeutical value in the treatment of neurodegenerative disorders where accelerated α-synuclein aggregation has been described.

Compounds capable of inhibiting POP are effective for preventing experimental cognitive impairment induced by scopolamine in rats, inferring that POP inhibitors have functions in the alleviation of mnemonic dysfunctions (Yoshimoto T et al., *J. Pharmacobiodyn.* 1987; 10:730-5).

The effect of subchronic administration of rosmarinic acid, a non-competitive POP inhibitor (with a relatively high IC50 value of 63.7 µM), was tested in the Morris water maze in rats, and an enhancement in spatial memory was reported (Park D H et al., *Fitoterapia* 2010; 81(6):644-8).

It has been found that patients with bipolar disorder have high levels of activity of the POP in serum. In recent years, POP has gained importance as a target for the treatment of this disease, especially due to his involvement in the metabolism of inositol-1,4,5-trisphosphate (IP3). IP3 is a key molecule in the transduction of the signal in the cascade of neuropeptides. Through the binding to specific receptors, neuropeptides induce an increase of IP3, which binds to its receptor on the membrane of the endoplasmic reticulum and induces the release of Ca2+, which is believed to play a crucial role in learning and memory. Recent findings have shown that the POP modulates the concentration of IP3 (Komatsu Y *J. Neurosci.* 1996; 16:6342-52). Thus, it is known that a disruption of the gene of the POP in the eukaryotic *Dictyostelium discoideum* induces resistance to lithium via elevation of IP3 (Schulz I et al., *Eur. J. Biochem.* 2002; 269:5813-20), and also reduced the proteolytic activity of POP, which is responsible for the high concentration IP3 in glioma cells antisense human for POP. This effect is also observed when these cells are treated with specific POP inhibitors (Williams R S et al., *EMBO J.* 1999; 18:2734-45).

The IP3 signaling pathway is involved in the action of several drugs therapeutic mood stabilizers (lithium, carbamazepine and valproic acid) and defects in the mechanisms that regulate the IP3 signaling may cause bipolar disorder. Moreover, the mood stabilizer drug that is commonly used to treat bipolar disorder, valproic acid, directly inhibits the activity of recombinant POP (Cheng L et al., *Mol. Cell. Neurosci.* 2005; 29: 155-61). In summary, there is strong evidence that POP inhibitors are useful in the prevention and/or treatment of bipolar affective disorder in mammals. Thus, to provide novel inhibitors of POP is interesting in the therapy of this disorder or disease.

In summary, the effects of several POP inhibitors in various cognitive tasks have been characterized, and there is consensus that POP inhibitors have positive effects on learning and memory (Morain P et al., *CNS Drug. Rev.* 2002; 8(1):31-52; Shinoda M et al., *Eur. J. Pharmacol.* 1996; 305(1-3):31-8; Marighetto A et al., *Learn. Mem.* 2000; 7(3):159-69; Toide K et al., *Pharmacol. Biochem. Behav.* 1997; 56(3):427-34; Schneider J S et al., *Neuropsychopharmacology* 2002; 26(2):176-82).

Several patents and patent applications disclose POP inhibitors: WO 2008/077978 A1, WO 2005/027934 A1, JP 2011-037874 A2, WO 2005/002624 A1, WO 2004/060862 A2, WO 03/04468 A1; DE 196 03 510 A1, US 2006/0100253 A1 and U.S. Pat. No. 6,159,938 A, but only a few compounds have undergone in vivo studies (JTP-4819, S-17092, Z-321, ONO-1603, Y-29794, ZTTA, Z-Pro-Prolinal, and KYP-2047). From this list, first four inhibitors in the list have entered clinical trials and none of them has reached the market place.

WO 2014/072498 A1 discloses POP inhibitors with a high affinity to POP and a good capacity to cross the blood-brain barrier to reach the brain where the action of the inhibitor takes place when used to treat cognitive disorders. This is an important feature for the compounds to be good candidates for use in the therapy of cognitive disorders.

In WO 2014/072498 A1 it was described that formulation of the compounds disclosed therein could be adapted for any administration route. However, in the only in vivo examples disclosed in said application the compounds were administered sub-cutaneously.

It would be an advantage to be able to administer a POP inhibitor through the oral route as this is the most convenient from a patient's perspective.

Thus, there is a need to identify new POP inhibitors, which are particularly well adapted for oral administration and effectively reach the brain, which is the site of action when said POP inhibitors are used in the therapy of cognitive disorders. Serotonin receptor antagonist antagonists (5-HT1A receptor) are commonly used as antidepressant drugs. However, they induce significant sexual dysfunction (Uphouse L, Pharmacol. Biochem. Behav. 2014; 0:31-42), limiting its use for chronic therapy in the adult population. For this reason, a POP inhibitor with positive effects on cognition in mood disorders and without such adverse event will have a significant impact in patient's quality of life.

SUMMARY

The inventors have now successfully found that 1-[1-(4-benzyloxy-3,5-difluoro-benzoyl)-4-fluoro-pyrrolidine-2-carbonyl]-pyrrolidine-2-carbonitrile, its stereoisomers and salts thereof are not only capable of inhibiting POP with a high potency but also show high gastrointestinal penetration capacity, achieve high brain exposure allowing them to be specially effective when administered orally and have little binding to the 5-HT1A receptor avoiding negative side effects such as sexual dysfunction.

Therefore, one aspect of the invention relates to 1-[1-(4-benzyloxy-3,5-difluoro-benzoyl)-4-fluoro-pyrrolidine-2-carbonyl]-pyrrolidine-2-carbonitrile having the formula (I):

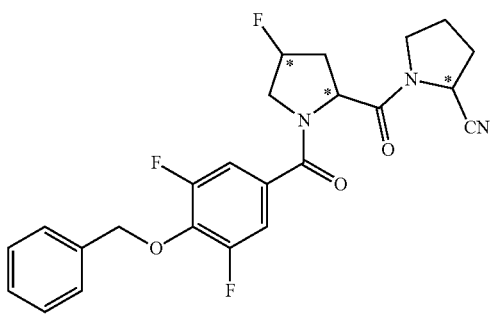

(I)

(wherein the asterisk in the formula indicate the presence of chiral centers), stereoisomers thereof and pharmaceutically acceptable salts thereof.

Another aspect of this invention refers to processes for the preparation of a compound of formula (I) as defined above stereoisomers thereof and pharmaceutically acceptable salts thereof.

Another aspect of this invention refers to a medicament or pharmaceutical composition comprising at least one compound of formula (I) as defined above, stereoisomers thereof and pharmaceutically acceptable salts thereof and a pharmaceutically acceptable carrier, adjuvant or vehicle.

Another aspect of this invention refers to a compound of formula (I) as defined above, stereoisomers thereof and pharmaceutically acceptable salts thereof, for use as a medicament, particularly for the prevention and/or treatment of cognitive disorders and/or neurodegenerative disorders such as synucleinopathies (diseases due to the accumulation of synuclein such as Parkinson's disease, REM sleep behaviour disorder, Lewy body disease or multiple systems atrophy). In particular the cognitive disorders may be associated with a disease selected from the group consisting of schizophrenia, major depressive disorder, bipolar affective disorder, REM sleep behavior disorder, Alzheimer's disease, frontotemporal dementia, Parkinson's disease, Lewy body disease, multiple systems atrophy, progressive supranuclear palsy, cortico-basal degeneration or amyotrophic lateral sclerosis.

Another aspect of this invention refers to a method for the treatment or prophylaxis of cognitive disorders in a mammal wherein a therapeutic amount of a compound of formula (I) as defined above, stereoisomers thereof and pharmaceutically acceptable salts thereof, is administered to a patient in need of said treatment. In a particular embodiment the disorder is a cognitive disorder associated with a disease selected from the group consisting of schizophrenia, major depressive disorder, bipolar affective disorder, REM sleep behavior disorder, Alzheimer's disease, frontotemporal dementia, Parkinson's disease, Lewy body disease, multiple systems atrophy, progressive supranuclear palsy, cortico-basal degeneration or amyotrophic lateral sclerosis.

Another aspect of this invention refers to the use of a compound of formula (I) as defined above, stereoisomers thereof and pharmaceutically acceptable salts thereof, for the preparation of a medicament, particularly for the prevention and/or treatment of cognitive disorders and more particularly a cognitive disorder associated with a disease selected from the group consisting of schizophrenia, major depressive disorder, bipolar affective disorder, REM sleep behavior disorder, Alzheimer's disease, frontotemporal dementia, Parkinson's disease, Lewy body disease, multiple systems atrophy, progressive supranuclear palsy, cortico-basal degeneration or amyotrophic lateral sclerosis. These aspects and preferred embodiments thereof are additionally also defined in the claims.

DETAILED DESCRIPTION OF THE PREFERRED EMBODIMENT

Figure 1:
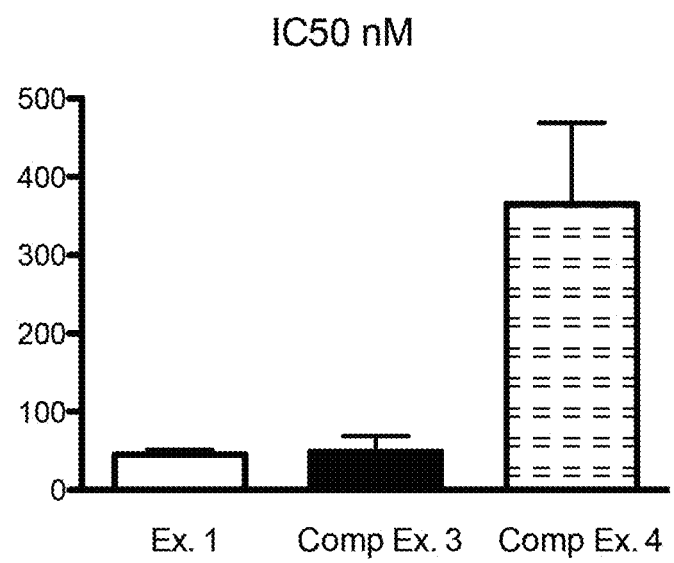
FIG. 1 shows the results of the POP inhibition assay for the compounds of example 1, comparative example 3 and comparative example 4.

In the context of the present invention, the following terms have the meaning detailed below.

The term "salt" must be understood as any form of an active compound used in accordance with this invention in which said compound is in ionic form or is charged and coupled to a counter-ion (a cation or anion) or is in solution. This definition also includes quaternary ammonium salts and complexes of the active molecule with other molecules and ions, particularly, complexes formed via ionic interactions. The definition includes in particular physiologically acceptable salts; this term must be understood as equivalent to "pharmacologically acceptable salts" or "pharmaceutically acceptable salts".

The term "pharmaceutically acceptable salts" in the context of this invention means any salt that is tolerated physiologically (normally meaning that it is not toxic, particularly, as a result of the counter-ion) when used in an appropriate manner for a treatment, applied or used, particularly, in humans and/or mammals. These physiologically acceptable salts may be formed with cations or bases and, in the context of this invention, are understood to be salts formed by at least one compound used in accordance with the invention—normally an acid (deprotonated)—such as an anion, particularly when used on humans and/or mammals. These physiologically acceptable salts may also be formed with anions or acids and, in the context of this invention, are understood as being salts formed by at least one compound used in accordance with the invention—normally protonated, for example in nitrogen—such as a cation and at least one physiologically tolerated anion, particularly when used on humans and/or mammals. This definition specifically includes in the context of this invention a salt formed by a physiologically tolerated acid, i.e. salts of a specific active compound with physiologically tolerated organic or inorganic acids—particularly when used on humans and/or mammals. Examples of this type of salts are those formed with: hydrochloric acid, hydrobromic acid, sulphuric acid, methanesulfonic acid, formic acid, acetic acid, oxalic acid, succinic acid, malic acid, tartaric acid, mandelic acid, fumaric acid, lactic acid or citric acid.

The compounds of the present invention represented by the above described formula (I) may include enantiomers arising from the presence of three chiral centres in the molecule. The single enantiomers and any mixture of two or more of them fall within the scope of the present invention.

Unless otherwise stated, the compounds of the invention are also meant to include isotopically-labelled forms i.e. compounds which differ only in the presence of one or more isotopically-enriched atoms. For example, compounds having the present structures except for the replacement of at least one hydrogen atom by a deuterium or tritium, or the replacement of at least one carbon by $^{13}C$- or $^{14}C$-enriched carbon, or the replacement of at least one nitrogen by $^{15}N$-enriched nitrogen are within the scope of this invention.

The compounds of formula (I), or their salts are preferably in pharmaceutically acceptable or substantially pure form. By pharmaceutically acceptable form is meant, inter alia, having a pharmaceutically acceptable level of purity excluding normal pharmaceutical additives such as diluents and carriers, and including no material considered toxic at normal dosage levels. Purity levels for the drug substance are preferably above 50%, more preferably above 70%, most preferably above 90%. In a preferred embodiment it is above 95% of the compound of formula (I) or of its salts.

As noted previously, the term "pharmaceutically acceptable salts" refers to any salt, which, upon administration to the recipient, is capable of providing (directly or indirectly) a compound as described herein. However, it will be appreciated that non-pharmaceutically acceptable salts also fall within the scope of the invention since those may be useful in the preparation of pharmaceutically acceptable salts, solvates and prodrugs. The preparation of salts can be carried out by methods known in the art.

As used herein, the terms "treat", "treating" and "treatment" include the eradication, removal, reversion, alleviation, modification, or control of a disease or condition, such as a cognitive disorder.

As used herein, the terms "prevention", "preventing", "preventive", "prevent" and "prophylaxis" refer to the capacity of a compound of formula (I) to avoid, minimize or difficult the onset or development of a disease or condition, such as a cognitive disorder, before its onset.

Therefore, by "treating" or "treatment" and/or "preventing" or "prevention", as a whole, is meant at least a suppression or an amelioration of the symptoms associated with the condition afflicting the subject, where suppression and amelioration are used in a broad sense to refer to at least a reduction in the magnitude of a parameter, e.g., symptom associated with the condition being treated, such as a cognitive disorder. As such, the method of the present invention also includes situations where the condition is completely inhibited, e.g., prevented from happening, or stopped, e.g., terminated, such that the subject no longer experiences the condition. As such, the present method includes both preventing and managing a cognitive disorder.

The terms "cognitive disorder" and "mild cognitive impairment" are used herein interchangeably to designate any condition characterized by a deficit in mental activities associated with thinking, learning, or memory. Examples of such disorders include agnosias, amnesias, aphasias, apraxias, deliriums, dementias, and learning disorders.

The cognitive disorder may be (and frequently is) associated with (that is, be caused by or occur in the presence of) other conditions characterized by damage to or loss of neurons or other structures involved in the transmission of signals between neurons. Hence, cognitive disorders may be associated with neurodegenerative diseases such as Alzheimer's disease, corticobasal degeneration, Creutzfeldt-Jacob disease, frontotemporal lobar degeneration, Huntington's disease, multiple sclerosis, normal pressure hydrocephalus, organic chronic brain syndrome, Parkinson's disease, Pick disease, vascular dementia, Lewy body disease, multiple systems atrophy, progressive supranuclear palsy.

Cognitive disorders may also be associated with other conditions which impair normal functioning of the central nervous system, including psychiatric disorders such as anxiety disorders, dissociative disorders, mood disorders such as bipolar affective disorder, schizophrenia, and somatoform and factitious disorders.

The compounds described here may be used to treat agnosias, amnesias, aphasias, apraxias, deliriums, dementias, learning disorders and other cognitive disorders.

Examples of dementias which may be treated with the methods of the invention include AIDS dementia complex, Binswanger's disease, dementia with Lewy Bodies, frontotemporal dementia, multi-infarct dementia, Pick's disease, semantic dementia and vascular dementia.

Examples of learning disorders which may be treated with the methods of the invention include Asperger's syndrome, attention deficit disorder, attention deficit hyperactivity disorder, autism, childhood disintegrative disorder, Down syndrome and Rett syndrome.

Examples of aphasia which may be treated with the methods of the invention include progressive non-fluent aphasia.

The compounds described here may also be used to treat patient having deficits in mental activities that are mild or that otherwise do not significantly interfere with daily life. Mild cognitive impairment is an example of such a condition: a patient with mild cognitive impairment displays symptoms of dementia (e.g., difficulties with language or memory) but the severity of these symptoms is such that a diagnosis of dementia may not be appropriate. The compounds described here may be used to treat mild cognitive impairment and other, similarly less severe forms of cognitive disorders.

Thus, another aspect of the present invention is a method for the treatment or prophylaxis of cognitive disorders in a mammal wherein a therapeutic amount of a compound of the invention is administered to a patient in need of said treatment.

In a particular embodiment the method of treatment or prophylaxis is carried out by administering to a patient in need of said treatment a therapeutic amount of a compound of the invention by oral route.

In a particular embodiment the compounds of the invention are administered orally at a daily dose comprised between 0.01 and 1.90 mg/kg, for example 0.01, 0.05, 0.1, 0.15, 0.20, 0.25, 0.30, 0.35, 0.40, 0.45, 0.50, 0.55, 0.60, 0.65, 0.70, 0.75, 0.80, 0.85, 0.90, 0.95, 1.0 1.05, 1.10, 1.15, 1.20, 1.25, 1.30, 1.35, 1.40, 1.45, 1.50, 1.55, 1.60, 1.65, 1.70, 1.75, 1.80, 1.85 or 1.90 mg/kg. The compounds of the invention may be administered at any of the above mentioned indicated daily oral doses once daily, twice daily, three time a day, for times a day, five times a day or six times a day.

In a particular embodiment of the present invention the compounds described here may be used to treat patients having a cognitive disorder associated with schizophrenia, bipolar affective disorder, Alzheimer's disease or Parkinson's disease.

In a particular embodiment of the present invention the compounds have the following formula (Ia):

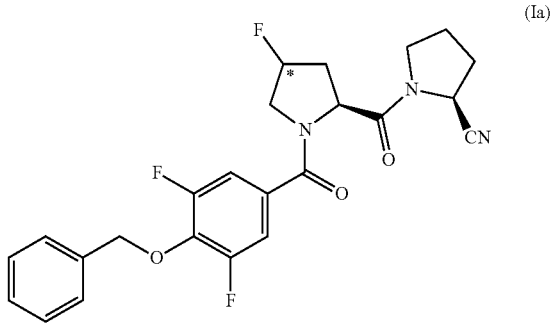 [SMILES: N#C[C@@H]1CCCN1C(=O)[C@@H]1CC(F)CN1C(=O)c1cc(F)c(OCc2ccccc2)c(F)c1]
(Ia)

Particular individual compounds of the invention falling under formula (I) include the compounds listed below:

(S)-1-((2S,4R)-1-(4-(benzyloxy)-3,5-difluorobenzoyl)-4-fluoropyrrolidine-2-carbonyl)pyrrolidine-2-carbonitrile (R)-1-((2S,4R)-1-(4-(benzyloxy)-3,5-difluorobenzoyl)-4-fluoropyrrolidine-2-carbonyl)pyrrolidine-2-carbonitrile (S)-1-((2R,4R)-1-(4-(benzyloxy)-3,5-difluorobenzoyl)-4-fluoropyrrolidine-2-carbonyl)pyrrolidine-2-carbonitrile (R)-1-((2R,4R)-1-(4-(benzyloxy)-3,5-difluorobenzoyl)-4-fluoropyrrolidine-2-carbonyl)pyrrolidine-2-carbonitrile (S)-1-((2S,4S)-1-(4-(benzyloxy)-3,5-difluorobenzoyl)-4-fluoropyrrolidine-2-carbonyl)pyrrolidine-2-carbonitrile (R)-1-((2S,4S)-1-(4-(benzyloxy)-3,5-difluorobenzoyl)-4-fluoropyrrolidine-2-carbonyl)pyrrolidine-2-carbonitrile (S)-1-((2R,4S)-1-(4-(benzyloxy)-3,5-difluorobenzoyl)-4-fluoropyrrolidine-2-carbonyl)pyrrolidine-2-carbonitrile (R)-1-((2R,4S)-1-(4-(benzyloxy)-3,5-difluorobenzoyl)-4-fluoropyrrolidine-2-carbonyl)pyrrolidine-2-carbonitrile or a pharmaceutically acceptable salt thereof.

The compounds of formula (I) defined above can be obtained by available synthetic procedures as illustrated by the following general schemes:

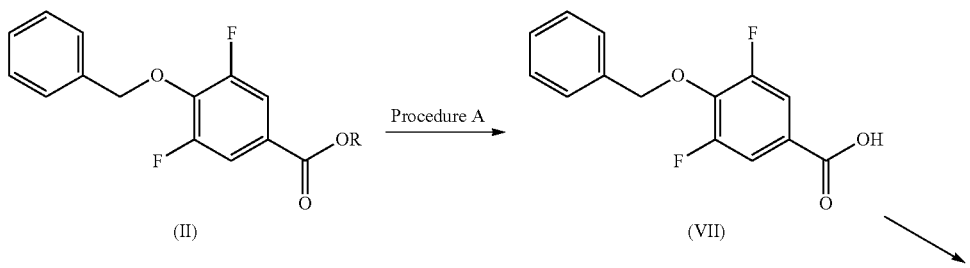

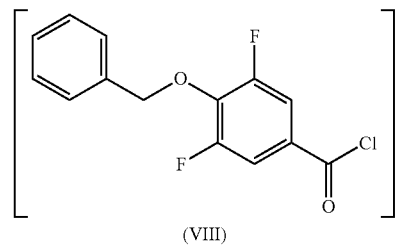

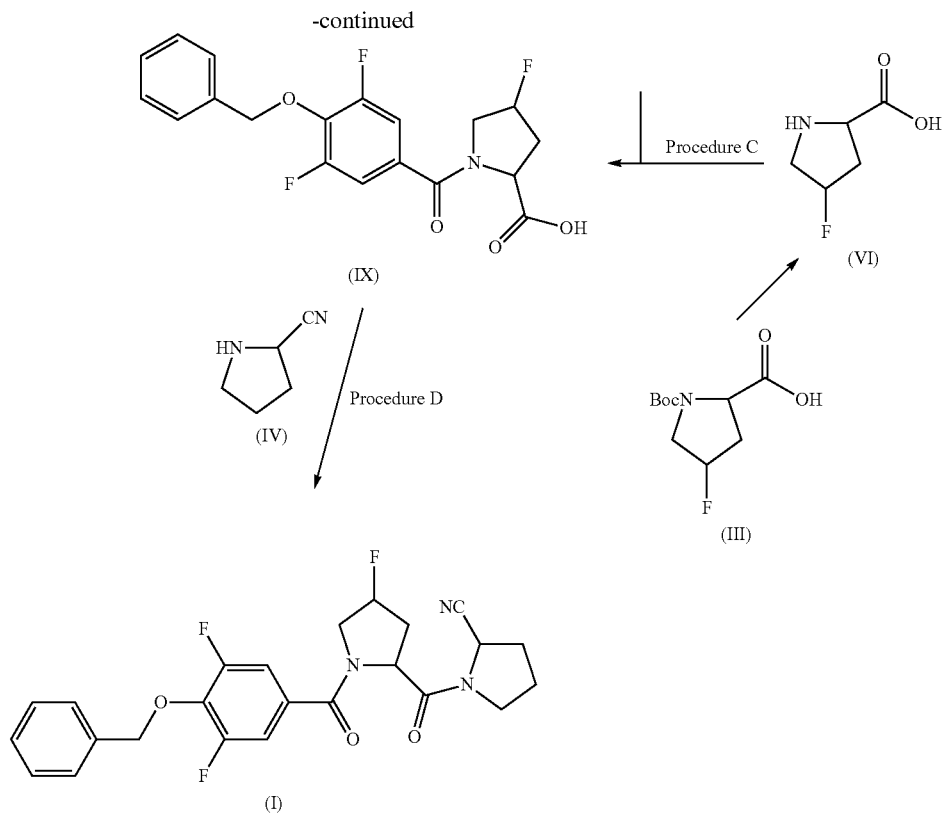

In a first step the ester of formula (II) is dissolved or suspended in a polar organic solvent (preferably a protic polar organic solvent) such as ethanol (EtOH) or methanol or a mixture of polar organic solvents. An aqueous base solution is added and the hydrolytic reaction is performed by maintaining the mixture, typically under reflux, at a temperature comprised between room temperature and the reflux temperature of the solvent mixture until completion of the hydrolysis, typically for a period of 0.5 to 4 hours, preferably 1-2 hours. The base solution is preferably of inorganic nature, such as a dilute alkali, for example NaOH. Then the reaction mixture is left to reach room temperature and, preferably, concentrated to approximately a fifth of the reaction volume. The reaction mixture is then slowly added to an acid solution such as a 1M HCl solution to effect neutralization, while cooled in an ice bath. If acidification leads to precipitation, the solid is filtered and washed with water, providing the product of formula (VII). If no precipitate is obtained, the resulting solution is extracted several times with an appropriate organic solvent such as ethyl acetate, the organic phase is dried and evaporated. The crude product of formula (VII) is purified by flash chromatography.

Deprotection of the amine of formula (III) is achieved under mild acidic conditions, such as addition onto a hydrogen chloride solution in an organic solvent such as dioxane, or with a TFA/DCM mixture, at low temperature ranging from 0° C. to room temperature. The reaction is stirred at room temperature for 1-3 hours. The solvent is then evaporated to dryness, to give the hydrochloride salt or the trifluoroacetate salt of the amine of formula (VI), depending on the acid used.

The compound of formula (IX) is prepared from the carboxylic acid of formula (VII) and amine of formula (VI) under Schotten-Baumann conditions. Thus, a chlorinating agent such as oxalyl chloride is added to a solution of the carboxylic acid of formula (VII) in an organic solvent such as toluene. The reaction is stirred at a temperature between 50° C. and 80° C. for 1 to 2 hours to allow for the formation of the carboxylic acid chloride of formula (VIII). After evaporation of the solvent, the resulting crude is solubilized in an organic solvent such as THF and added to an aqueous basic solution of the amine of formula (VI), typically an aqueous NaOH solution of the amine of formula (VI), at a low temperature such as 0° C. The reaction mixture is stirred at the low temperature for 1 to 2 hours and at room temperature during 2 to 4 hours. Then, the solvent is evaporated and the remaining aqueous fraction is adjusted to acid pH (3-4) by addition of a HCl solution and extracted with ethyl acetate. The organic phase is washed with brine, dried, filtered and evaporated. The crude product is purified by flash chromatography when necessary.

The product of formula (IX) is then coupled to pyrrolidine-2-carbonitrile of formula (IV) in the presence of a base, such as a N,N-diisopropylethylamine (DIEA), and aided by a coupling reagent, such as a carbodiimide. In particular, the compound of formula (IX) is dissolved in an aprotic organic solvent such as dichloromethane and added to a carbodiimide, for example a solid-supported carbodiimide such as N-cyclohexylcarbodiimide, N'-methyl polystyrene, together with DIEA. After 5 min, pyrrolidine-2-carbonitrile of formula (IV) and extra DIEA are added. The reaction is stirred at room temperature for 8 to 16 hours. Then, the reaction mixture is filtered and the remaining solid is washed with the aprotic organic solvent. The filtrate is evaporated to dryness. The crude product is then purified by preparative RP-HPLC.

Alternatively, the compounds of formula (I) may be prepared as illustrated in the following scheme and described below:

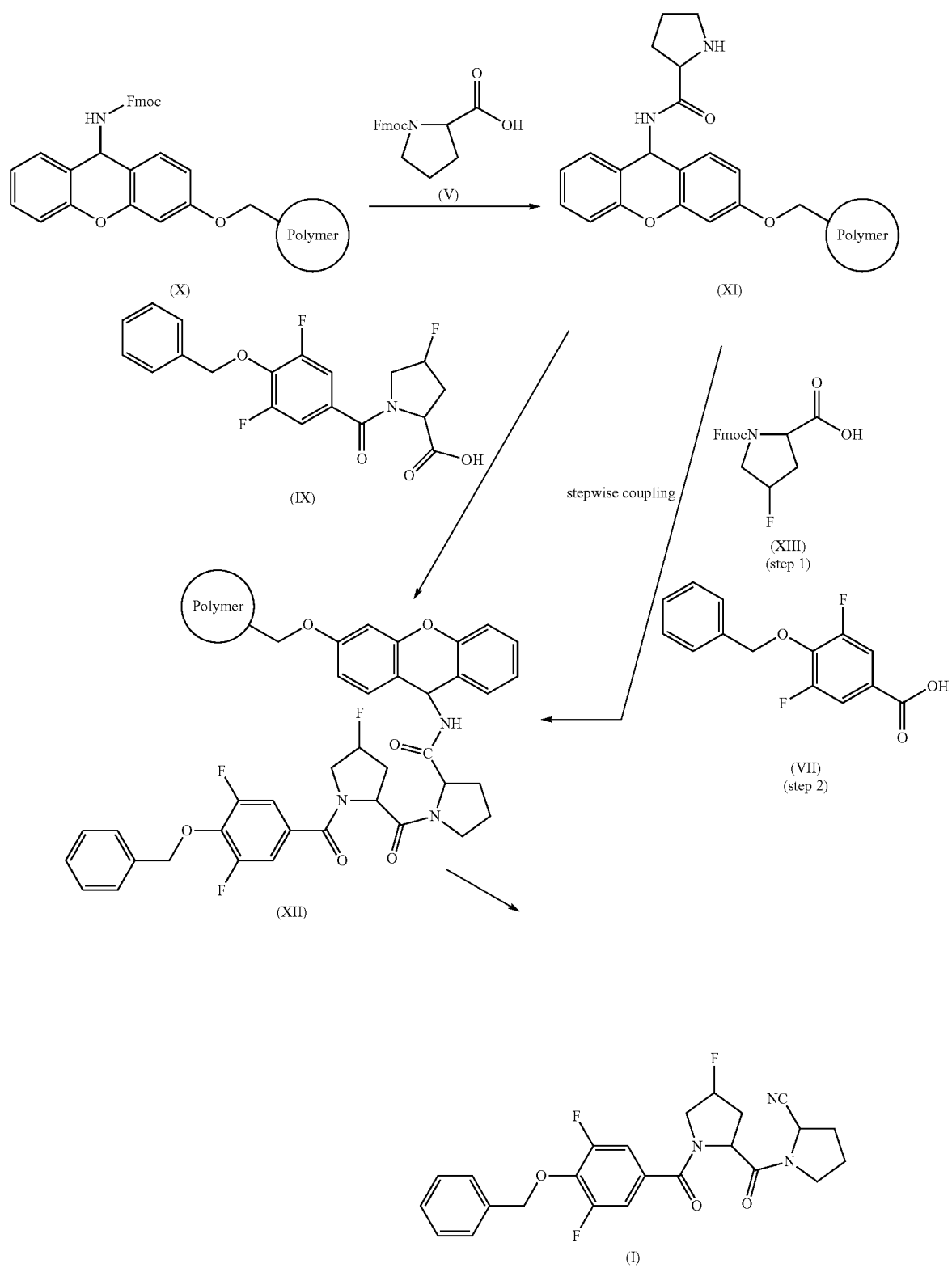

An amine-functionalised resin such as Sieber amide resin of formula (X) is placed in a syringe fitted with a polyethylene porous disk. The resin is swelled by washes with appropriate organic solvents such as dichloromethane (DCM) and dimethylformamide (DMF). When the amine group of the resin is protected (i.e. in the case of Sieber amide resin), removal of the protecting group (such as a fluorenylmethoxycarbonyl (Fmoc) protecting group) is achieved by treatment with an amine base solution such as a piperidine solution in DMF.

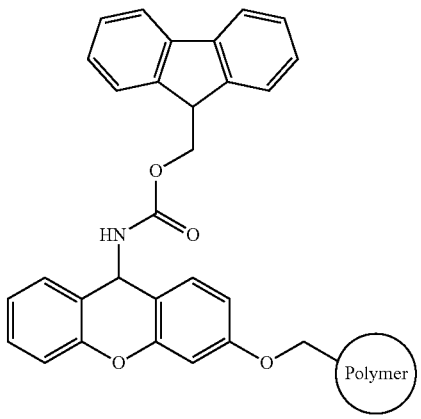

(X)

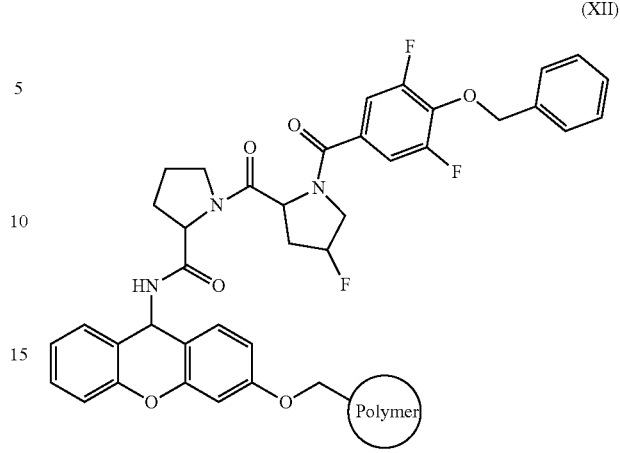

(XII)

Following removal of the protecting group from the resin, Fmoc-protected Proline of formula (V) is attached to the resin using an activating agent such as a triazole (i.e. TBTU) and an amine base such as DIEA in an appropriate organic solvent such as DMF. The mixture is stirred during 1 to 2 hours. After filtration and washing, the extent of the coupling may be monitored using the Kaiser test, re-coupling is performed when required. Fmoc is removed to yield product of formula (XI) by a treatment with an amine base solution such as a piperidine solution in DMF and/or a mixture of piperidine/DBU/toluene/DMF. Fmoc removal may be assessed using the p-nitrophenyl ester NF31 test.

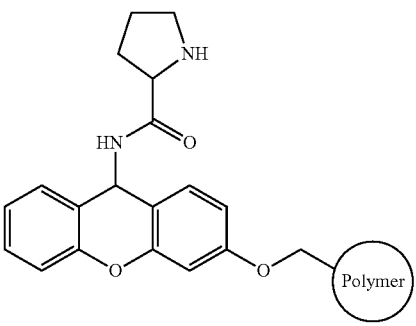

(XI)

The product of formula (XI) is coupled to the product of formula (IX) to yield the product of formula (XII) using an activating agent such as PyBOP, in the presence or in the absence of an additive such as HOAt, and an amine base such as DIEA in an appropriate organic solvent such as DMF. The mixture is stirred manually during the total reaction time of 1 to 2 hours. A systematic re-coupling is done using the same amounts and time. The extent of the coupling may be monitored using the p-nitrophenyl ester NF31 test.

Alternatively, the product of formula (XII) may also be obtained by stepwise coupling of product (XI) first to compound of formula (XIII), followed by the removal of the Fmoc protecting group and then coupling with compound of formula (VII).

The product of formula (XII), thoroughly washed with an appropriate organic solvent such as DCM and dried, is transferred to a flask, to which trifluoroacetic anhydride and pyridine are added in a small amount of an organic solvent. The mixture is kept at a temperature of 20 to 40° C. for 8 to 16 hours. Then, the reaction mixture is filtered and the resin is washed with the same organic solvent. The filtrates are collected and the solvent is evaporated to dryness. The resulting crude is dissolved in an appropriate solvent such as ethyl acetate and washed with saturated $NaHCO_3$ solution and a 5% aq. $KHSO_4$ solution. The organic phase is dried, filtered, and evaporated. The crude is taken up in $H_2O$:$CH_3CN$ and lyophilized to yield the peptide nitrile of formula (I).

Alternatively, the peptidyl-resin of formula (XII) may be treated with a mixture of TFA/$H_2O$/TIS during 1-2 hours. Then, the resin is filtered and washed with TFA, the filtrates are collected and the solvent is evaporated to dryness. The crude is resuspended in a mixture of $H_2O$:$CH_3CN$ and lyophilized. The resulting crude peptide amide is taken up in an appropriate organic solvent such as DCM and converted to the nitrile for example in the presence of phosphorus pentoxide, titanium tetrachloride, thionyl chloride, trifluoroacetic anhydride/pyridine or triphenylphosphine/carbontetrachloride. The mixture is kept at room temperature for 8 to 16 hours, the solvent is evaporated and the residue taken up in ethyl acetate. The organic solution is subsequently washed with aq. $KHSO_4$ solution and aq. $NaHCO_3$ solution. Drying and evaporation of the organic phase yields the peptide nitrile of formula (I).

The crude product is purified by RP-HPLC.

Where the above described processes for the preparation of compounds of the invention give rise to mixtures of stereoisomers, these isomers may be separated by conventional techniques such as preparative chromatography. If there are chiral centers, the compounds may be prepared in racemic form, or individual enantiomers may be prepared either by enantiospecific synthesis or by resolution.

The compounds of formulae (II), (III), (IV) and (V), as well as some of the compounds of formula (VII), used as starting products are either commercially available and may also be prepared using methods well known to the expert in the field.

Thus, in one aspect the present invention provides for processes for the preparation of a compound of formula (I) or a pharmaceutically acceptable salt, isomer, prodrug or solvate thereof.

In one embodiment the process comprises the steps of:

a) reacting a compound of formula (IX):

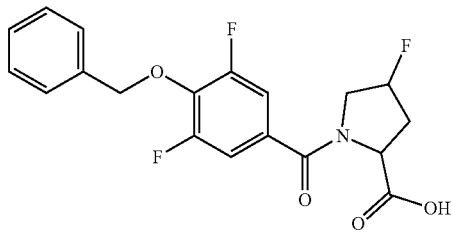
(IX)

with a compound of formula (XI):

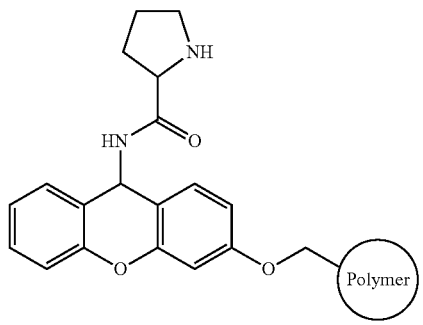
(XI)

wherein polymer stands for a polymer which is inert under the reaction conditions of the synthetic method herein-disclosed and insoluble but swellable in the solvents herein-employed such as low cross-linked polystyrene and polyethyleneglycol-grafted polystyrene polymers.

to yield a compound of formula (XII):

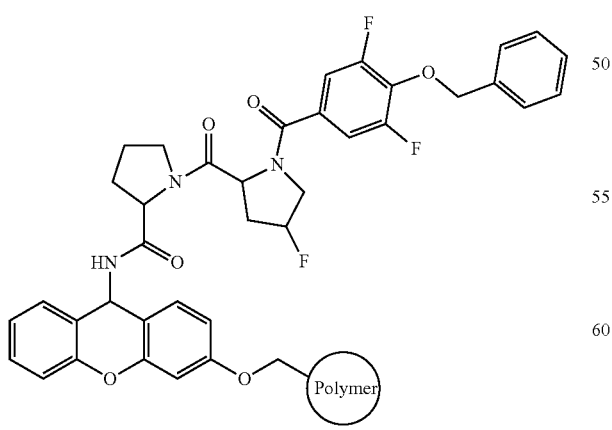
(XII)

b) hydrolising the compound of formula (XII) to yield the compound of formula (XIV):

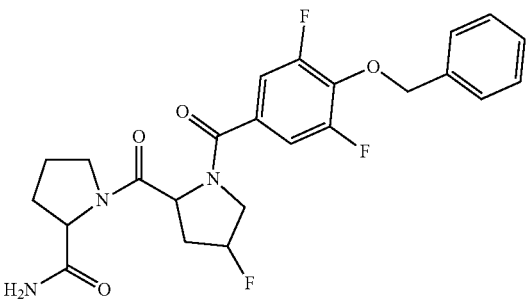
(XIV)

and c) subjecting the compound of formula (XIV) to conditions capable of transforming a carboxamide group into a nitrile group to yield the compound of formula (I):

wherein steps b) and c) may be performed separately or in a one pot reaction.

In another embodiment of the present invention the process for the preparation of a compound of formula (I) or a pharmaceutically acceptable salt, isomer, prodrug or solvate thereof, comprises the steps of:

a) reacting a compound of formula (IX):

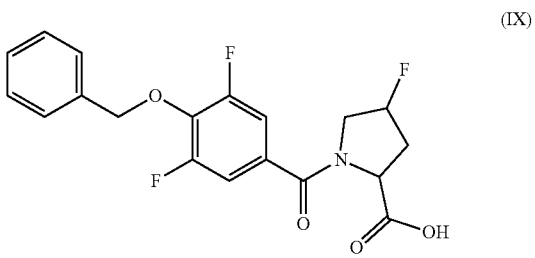 [SMILES: O=C(O)C1CC(F)CN1C(=O)c1cc(F)c(OCc2ccccc2)c(F)c1]
(IX)

with a compound of formula (IV):

(IV)

In still another embodiment the process comprises the steps of:

a) reacting a compound of formula (XI):

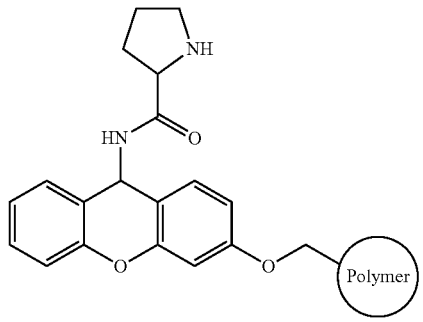

(XI)

wherein polymer stands for a polymer which is inert under the reaction conditions of the synthetic method herein-disclosed and insoluble but swellable in the solvents herein-employed such as low cross-linked polystyrene and polyethyleneglycol-grafted polystyrene polymers.

with a compound of formula (XIII):

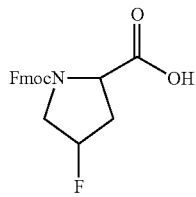

(XIII)

b) removing the Fmoc protecting group
c) reacting with a compound of formula (VII):

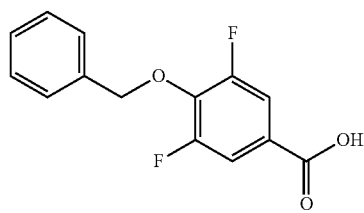

(VII)

d) hydrolising the resulting product from the supporting polymer to yield the compound of formula (I):

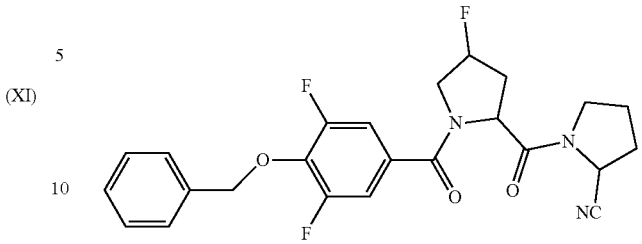

(I)

It has been found that the compounds of general formula (I) are useful in the treatment of cognitive disorders, in particular cognitive disorders associated with other diseases or conditions of the central nervous system.

In a particular embodiment of the present invention, the cognitive disorder is a cognitive disorder associated with a disease selected from the group consisting of schizophrenia, bipolar affective disorder, Alzheimer's disease and Parkinson's disease.

The present invention further provides medicaments or pharmaceutical compositions comprising a compound of this invention, or a pharmaceutically salt, derivative, prodrug or stereoisomer thereof together with a pharmaceutically acceptable carrier, adjuvant, or vehicle, for administration to a patient.

The auxiliary materials or additives of a pharmaceutical composition according to the present invention can be selected among carriers, excipients, support materials, lubricants, fillers, solvents, diluents, colorants, flavour conditioners such as sugars, antioxidants, binders, adhesives, disintegrants, anti-adherents, glidants and/or agglutinants. In the case of suppositories, this may imply waxes or fatty acid esters or preservatives, emulsifiers and/or carriers for parenteral application. The selection of these auxiliary materials and/or additives and the amounts to be used will depend on the form of application of the pharmaceutical composition.

The medicament or pharmaceutical composition according to the present invention may be in any form suitable for the application to humans and/or animals, preferably humans including infants, children and adults and can be produced by standard procedures known to those skilled in the art. Therefore, the formulation in accordance with the invention may be adapted for topical or systemic application, particularly for dermal, transdermal, subcutaneous, intramuscular, intra-articular, intraperitoneal, intravenous, intra-arterial, intravesical, intraosseous, intracavernosal, intranasal, pulmonary, buccal, sublingual, ocular, intravitreal, percutaneous, rectal, vaginal, oral, epidural, intrathecal, intraventricular, intracerebral, intracerebroventricular, intracisternal, intraspinal, perispinal, intracranial, delivery via needles or catheters with or without pump devices, or other application routes.

In a preferred embodiment of the present invention, the pharmaceutical compositions are in oral form, either solid or liquid. Suitable dose forms for oral administration may be tablets, pills, caplets, gel caps, chewing gums, capsules, granules, drops, syrups or solutions and may contain conventional excipients known in the art such as binding agents, for example syrup, acacia, gelatin, sorbitol, tragacanth, or polyvinylpyrrolidone; fillers, for example lactose, sugar, maize starch, calcium phosphate, sorbitol or glycine; tabletting lubricants, for example magnesium stearate; disintegrants, for example starch, polyvinylpyrrolidone, sodium starch glycollate or microcrystalline cellulose; or pharmaceutically acceptable wetting agents such as sodium lauryl sulfate.

In another embodiment the pharmaceutical compositions are in the form of products for non-parenteral intranasal administration, preferably in the form of products for intranasal administration. Typically intranasal administration is carried out by using nasal sprays, squeeze bottles, and liquid droppers as delivery devices. To be used with these devices, the pharmaceutical compositions are advantageously liquid solutions or suspensions of the compounds of the invention.

The compositions may be prepared by conventional methods of blending, filling or tabletting. Repeated blending operations may be used to distribute the active agent throughout those compositions employing large quantities of fillers. Such operations are conventional in the art. The tablets may for example be prepared by wet or dry granulation and optionally coated according to methods well known in normal pharmaceutical practice, in particular with an enteric coating.

The pharmaceutical compositions may also be adapted for parenteral administration, such as sterile solutions, suspensions or reconstitutable dry preparations, aerosols or sprays in the appropriate unit dosage form. Adequate excipients can be used, such as bulking agents, buffering agents or surfactants.

The composition of the invention may be formulated as deposits in dissolved form or in patches, for percutaneous application.

Skin applications include ointments, gels, creams, lotions, suspensions or emulsions.

Suitable form of rectal application is by means of suppositories.

The mentioned formulations will be prepared using standard methods such as those described or referred to in the Spanish and US Pharmacopoeias and similar reference texts.

In one embodiment of the invention it is preferred that compound of formula (I) is used in therapeutically effective amounts. The physician will determine the dosage of the present therapeutic agents which will be most suitable and it will vary with the form of administration and the particular compound chosen, and furthermore, it will vary with the patient under treatment, the age of the patient, the type of disease or condition being treated. When the composition is administered orally, larger quantities of the active agent may be required to produce the same effect as a smaller quantity given parenterally. The compounds are useful in the same manner as comparable therapeutic agents and the dosage level is of the same order of magnitude as is generally employed with these other therapeutic agents. Active compounds will typically be administered once or more times a day for example 1, 2, 3 or 4 times daily, with typical total daily doses in the range of from 0.011 to 1.90 mg/kg/day.

The compounds and compositions of this invention may be used with other drugs to provide a combination therapy. The other drugs may form part of the same composition or be provided as a separate composition for administration at the same time or at different time.

Particularly, the combination of at least one compound of formula (I) and at least one another drug may be formulated for its simultaneous, separate or sequential administration, with at least a pharmaceutically acceptable carrier, additive, adjuvant or vehicle. This has the implication that the combination of the compound of formula (I) and the other drug may be administered:

a) As a combination that is being part of the same medicament formulation, both being then administered always simultaneously.
b) As a combination of two units, each with one of them giving rise to the possibility of simultaneous, sequential or separate administration. In a particular embodiment, the compound of formula (I) is independently administered from the other drug (i.e. in two units) but at the same time. In another particular embodiment, the compound of formula (I) is administered first, and then the other drug is separately or sequentially administered. In yet another particular embodiment, the other drug is administered first, and then the compound of formula (I) is administered, separately or sequentially, as defined.

In the context of the present invention, the following acronyms and abbreviations have been used, the meaning detailed below:
AcOEt Ethyl acetate
AD Alzheimer's disease
AUC Area under the curve
BBB Blood-Brain Barrier
Boc tert-Butoxycarbonyl
BSA Bovine serum albumin
DBU 1,8-Diazabicyclo[5.4.0]undec-7-ene
DCM Dichloromethane
DMEM Dulbecco's Modified Eagle's Medium
DI Discrimination index
DIEA N,N'Diisopropylethylamine
DMF Dimethylformamide
DMSO Dimethylsulfoxide
EtOH Ethanol
Fmoc 9-Fluorenylmethoxycarbonyl
FPLC Fast protein liquid chromatography
FTIR Fourier transform infrared spectrometer
HBSS Hanks' balanced solution salt
HOAt 1-Hydroxy-7-azabenzotriazole
hPOP Human prolyl oligopeptidase
IP Intraperitoneal
IP3 Inositol triphosphate
IPTG Isopropyl β-D-1-thiogalactopyranoside
LB Lysogeny broth
MALDI-TOF Matrix-assisted laser desorption/ionization—time-of-flight
MK-801 Dizocilpine
MS Multiple sclerosis
NMR Nuclear magnetic resonance
NOR Novel object recognition
OD Optical density
PAMPA Parallel artificial membrane permeability assay
PBS Phosphate buffered saline
PC Phosphatidylcholine
PE Phosphatidylethanolamine
pETM10 Plasmid pETM10
PI Phosphatidylinositol
POP Prolyl oligopeptidase
PS Phosphatidylserine
PyBOP (Benzotriazol-1-yloxy)tripyrrolidinophosphonium hexafluorophosphate
RP-HPLC Reverse phase high performance liquid cromatography
SD Standard deviation
SDS-PAGE Sodium dodecyl sulfate polyacrylamide gel electrophoresis
TBTU O-(Benzotriazol-1-yl)-N,N,N',N'-tetramethyluronium tetrafluoroborate
TEER Trans endothelial electrical resistance TFA Trifluoroacetic acid
THF Tetrahydrofuran
TIS Triisopropylsilane
Tris Tris(hydroxymethyl)aminomethane
Tβ4 Thymosin beta-4 protein
UPLC Ultra performance liquid chromatography
Z-G-P-AMC (N-Benzyloxycarbonyl-Gly-Pro-methyl-coumarinyl-7-amide)

The following examples are merely illustrative of certain embodiments of the invention and cannot be considered as restricting it in any way.

EXAMPLES

Specific Synthetic Conditions Used for the Preparations Described in the Examples Procedure A: Hydrolysis of Ester of Formula (II) to the Carboxylic Acid of Formula (VII) The ester of formula (II) (1 mmol) is solubilized in 95% EtOH. NaOH (3.7 mmol) is added and the reaction is maintained at reflux for approximately 2 hours. Then it is left to reach room temperature. The reaction mixture is concentrated to approx. 15-20 mL and then this solution is slowly added onto a 1M HCl solution, while cooled in an ice bath. A white solid precipitate, which is collected by filtration, washed with water and dried well before the next synthetic step. In the case that no precipitate appears, the resulting solution is extracted with AcOEt (3×), the organic phase is dried and evaporated. The crude product is purified by flash chromatography, if needed.

Procedure B: Deprotection of a Boc Protected Amine of Formula (III) to Yield the Amine of Formula (VI) The Boc protected amine of formula (III) (1 mmol) is slowly added onto 4M HCl in dioxane (20 ml) at 0° C. The reaction is stirred at room temperature for 2 hours. The solvent is then evaporated to dryness, to give the hydrochloride salt of the amine of formula (VI).

Procedure C: Coupling of an Amine of Formula (VI) to a Carboxylic Acid of Formula (VII) through Formation of the Carboxylic Acid Chloride of Formula (VIII).

Oxalyl chloride (1.5 mmol) is added to a solution of the carboxylic acid of formula (VII) (1 mmol) in toluene (5 ml). The reaction is stirred at 50° C. for 1.5 hours to allow for the formation of the carboxylic acid chloride of formula (VIII). After evaporation of the solvent, the resulting crude is solubilized in THF and added to an aqueous NaOH solution of the amine of formula (VI) (1.1 mmol) at 0° C. The reaction mixture is stirred at 0° C. for 1.5 hours and at room temperature for 3 hours. Then, THF is evaporated and the remaining aqueous fraction is adjusted to acid pH (3-4) by addition of 1M HCl solution and extracted with AcOEt. The organic phase is washed with brine, dried, filtered and evaporated. The crude product of formula (IX) is purified by flash chromatography when necessary.

Procedure D: Coupling of the Product of Formula (IX) to pyrrolidine-2-carbonitrile of Formula (IV) in Solution The product of formula (IX) (1.2 mmol) is dissolved in DCM and added to N-Cyclohexylcarbodiimide,N'-methyl polystyrene (3 mmol), together with DIEA (1 mmol). After 5 min, (S)-pyrrolidine-2-carbonitrile of formula (IV) (1 mmol) and DIEA (1 mmol) are added. The reaction is stirred at room temperature overnight. Then, the reaction mixture is filtered and the remaining solid is washed with DCM. The filtrate is evaporated to dryness. The crude product is then purified by preparative RP-HPLC and lyophilized to yield the product of formula (I).

Procedure E: General Procedure for Synthesis on Solid-Phase.

Swelling/conditioning of the resin: Sieber amide resin of formula (X) (1 eq) is placed in a syringe fitted with a polyethylene porous disk. The resin is swelled by washes with DCM and DMF. Removal of the fluorenylmethoxycarbonyl (Fmoc) protecting group is achieved by treatments with a 20% piperidine solution in DMF.

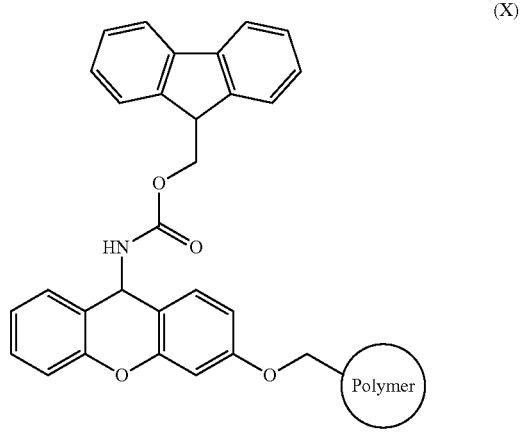 [SMILES: CCOc1ccc2c(c1)Oc1ccccc1C2NC(=O)OCC1c2ccccc2-c2ccccc21]

(X)

Then, Fmoc-protected Proline of formula (V) (4 eq) is attached to the resin using TBTU (4 eq) and DIEA (8 eq) in DMF. The mixture is intermittently stirred manually during 90 min. After filtration and washing, the extent of the coupling is monitored using the Kaiser test, re-coupling is performed when required. Fmoc is removed to yield product of formula (XI) by a treatment with a 20% piperidine solution in DMF and subsequently with a piperidine/DBU/toluene/DMF (20:5:5:70) solution. Fmoc removal is assessed using the p-nitrophenyl ester NF31 test (described in Madder, A. et al., Eur. J. Org. Chem. 1999; (11):2787-91).

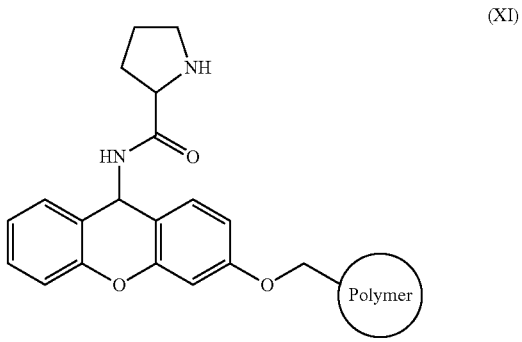 [SMILES: CCOc1ccc2c(c1)Oc1ccccc1C2NC(=O)C1CCCN1]

(XI)

The product of formula (IX) (2 eq) is coupled to the product of formula (XI) to yield the product of formula (XII) using PyBOP (2 eq), HOAt (6 eq) and DIEA (6 eq) in DMF. The mixture is intermittently stirred manually during the total reaction time, 90 min. A systematic re-coupling is done using the same amounts and time. The extent of the coupling is monitored using the p-nitrophenyl ester NF31 test.

Alternatively, the product of formula (XIII) (4 eq) is coupled to the product of formula (XI) using PyBOP (4 eq), HOAt (12 eq) and DIEA (12 eq) in DMF. The mixture is intermittently stirred manually during the total reaction time, 90 min. The extent of the coupling is monitored using the p-nitrophenyl ester NF31 test, and a re-coupling is done if necessary. The Fmoc group is removed by a treatment with a 20% piperidine solution in DMF and a treatment with a piperidine/DBU/toluene/DMF (20:5:5:70) solution. Subsequently, the product of formula (VII) (4 eq) is incorporated, using PyBOP (4 eq), HOAt (12 eq) and DIEA (12 eq) in DMF, to obtain the product of formula (XII). The mixture is intermittently stirred manually during the total reaction time, 90 min. The extent of the coupling is monitored using the p-nitrophenyl ester NF31 test, and a re-coupling is done if necessary.

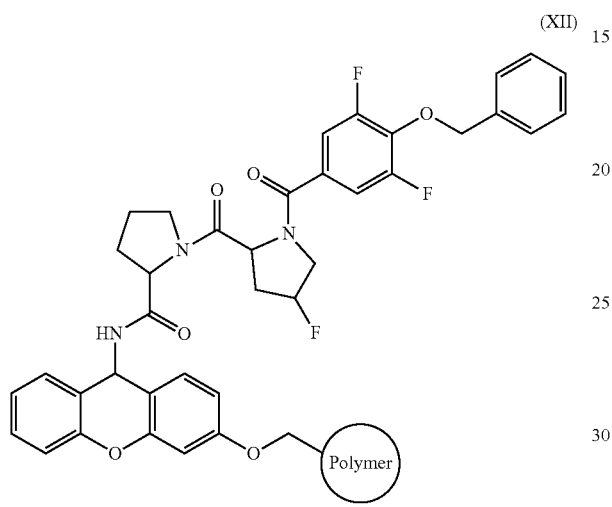

(XII)

The product of formula (XII), thoroughly washed with DCM and dried, is transferred to a round bottom flask, and trifluoroacetic anhydride (5 eq) and pyridine (10 eq) in DCM (approx. 2 mL/100 mg) are added. The mixture is kept at room temperature overnight. Then, the reaction mixture is filtered and the resin is washed with DCM. The filtrates are collected and the solvent is evaporated to dryness. The resulting crude is dissolved in AcOEt and washed with saturated NaHCO$_3$ solution and a 5% aq. KHSO$_4$ solution. The organic phase is dried, filtered, and evaporated. The crude is taken up in H$_2$O:CH$_3$CN (1:1) and lyophilized to yield the peptide nitrile of formula (I).

Alternatively, the peptidyl-resin of formula (XII) may be treated with a mixture of TFA/H$_2$O/TIS (95:2.5:2.5, approx. 2-5 mL/100 mg) during 1-2 hours. Then, the resin is filtered and washed with TFA, the filtrates are collected, and the solvent is evaporated to dryness. The crude is resuspended in a mixture of H$_2$O:CH$_3$CN (1:1) and lyophilized. The resulting crude peptide amide is taken up in DCM and trifluoroacetic anhydride (5 eq) and pyridine (10 eq) are added. The mixture is kept at room temperature overnight, the solvent is evaporated and the residue taken up in AcOEt. The organic solution is subsequently washed with aq. 5% KHSO$_4$ solution and aq. 10% NaHCO$_3$ solution. Drying and evaporation of the organic phase yield the peptide nitrile of formula (I).

The crude product is purified by RP-HPLC.

Example 1

(S)-1-((2S,4R)-1-(4-(benzyloxy)-3,5-difluorobenzoyl)-4-fluoropyrrolidine-2-carbonyl)pyrrolidine-2-carbonitrile

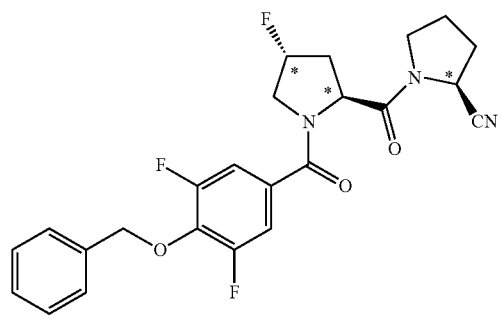 [SMILES: N#C[C@@H]1CCCN1C(=O)[C@@H]1C[C@@H](F)CN1C(=O)c1cc(F)c(OCc2ccccc2)c(F)c1]

Commercially available Fmoc-protected L-Proline (Fmoc-L-Pro-OH) of formula (V) (249.7 mg, 0.7 mmol), (2S,4R)-4-Fluoro-1-Fmoc-pyrrolodine-2-carboxylic acid (533 mg, 1.5 mmol) of formula (III) and 4-benzyloxy-3,5-difluoro benzoic acid (271 mg, 1 mmol) of formula (VII) are sequentially coupled onto commercially available Sieber amide resin (333.3 mg, 0.2 mmol, 1 eq), through stepwise coupling as described in Procedure E above. Purification by RP-HPLC affords 156 mg (0.341 mmol) of final product.

mp 137.6-139.1° C. FTIR: 1642, 1582, 1517, 1414, 1381, 1317, 1230, 1203, 1172, 1064, 1036 cm$^{-1}$. $^1$H-NMR (CDCl$_3$, 400 MHz) δ(ppm): 7.42 (2H, m), 7.35 (3H, m), 7.12 (2H, m), 5.30 (1H, m), 5.23 (1H, m), 4.93 (1H, dd), 4.82 (1H, m), 3.87 (2H, m), 4.08/3.69 (2H, m), 2.58/2.36 (2H, m), 2.26 (2H, m), 2.24 (2H, m).

Example 2

(S)-1-((2S,4S)-1-(4-(benzyloxy)-3,5-difluorobenzoyl)-4-fluoropyrrolidine-2-carbonyl)pyrrolidine-2-carbonitrile

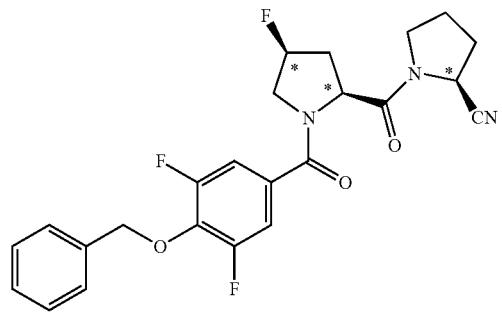 [SMILES: N#C[C@@H]1CCCN1C(=O)[C@@H]1C[C@H](F)CN1C(=O)c1cc(F)c(OCc2ccccc2)c(F)c1]

This compound was prepared following the process described in example 1 but replacing (2S,4R)-4-Fluoro-1-Fmoc-pyrrolodine-2-carboxylic acid with (2S,4S)-4-Fluoro-1-Fmoc-pyrrolodine-2-carboxylic acid. Purification by RP-HPLC affords 138 mg (0.302 mmol) of final product.

mp 135-137° C. FTIR: 3483, 2954, 1653, 1581, 1518, 1437, 1417, 1383, 1356, 1321, 1234, 1203, 1172, 1065, 1039, 1005, 960, 901, 856, 762, 737, 696 cm$^{-1}$.

Comparative Example 3

(S)-1-((2S)-1-(4-(benzyloxy)-3,5-dimethoxybenzoyl)-4,4-difluoropyrrolidine-2-carbonyl)pyrrolidine-2-carbonitrile

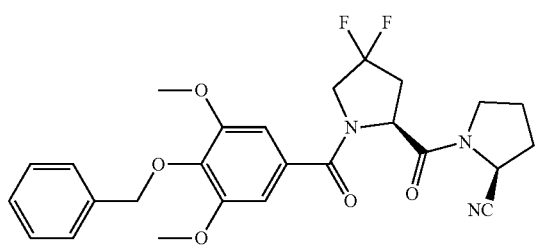 [SMILES: COc1cc(C(=O)N2CC(F)(F)C[C@H]2C(=O)N2CCC[C@H]2C#N)cc(OC)c1OCc1ccccc1]

Starting from commercially available Sieber amide resin (250 mg, 0.19 mmol, 1 eq), commercially available Fmoc-L-Proline (Fmoc-L-Pro-OH) (258 mg, 0.77 mmol) and ((S)-1-(4-(benzyloxy)-3,5-dimethoxybenzoyl)-4,4-difluoropyrrolidine-2-carboxylic acid) (161 mg, 0.38 mmol), the product is prepared following Procedure E described above. Purification by RP-HPLC affords 18 mg (0.036 mmol) of final product.

Comparative Example 4

(S)-1-((S)-1-(4-(benzyloxy)-3-fluorobenzoyl)-4,4-difluoropyrrolidine-2-carbonyl) pyrrolidine-2-carbonitrile

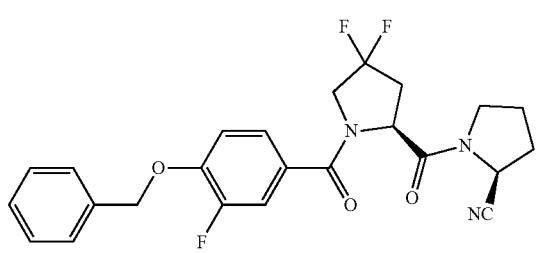 [SMILES: N#C[C@@H]1CCCN1C(=O)[C@@H]1CC(F)(F)CN1C(=O)c1ccc(OCc2ccccc2)c(F)c1]

Commercially available Fmoc-protected L-Proline (Fmoc-L-Pro-OH) (150 mg, 0.45 mmol), Fmoc-4,4-difluoro-L-proline (166 mg, 0.45 mmol) and 4-benzyloxy-3-fluorobenzoic acid (109 mg, 0.45 mmol) are sequentially coupled onto commercially available Sieber amide resin (200 mg, 0.15 mmol, 1 eq), through stepwise coupling as described in Procedure E above. Purification by RP-HPLC affords 14 mg (0.030 mmol) of final product.

PHARMACOLOGICAL DATA

DETERMINATION OF INHIBITORY EFFECT OF NOVEL COMPOUNDS ON (HUMAN) PROLYL OLIGOPEPTIDASE ACTIVITY

Expression and Purification of Prolyl Oligopeptidase (POP)

POP was obtained by expression in *E. coli* and affinity purification using a His tail fusion according to a literature procedure (Tarragó T et al., *Chem Bio Chem* 2006; 7:827-33) summarized below:

hPOP expression: *E. coli* BL21 competent cells were transformed with pETM10 hPOP. To induce expression, a pre-culture of LB medium (50 mL) containing kanamycin (50 μg/mL) was inoculated with one colony and was grown overnight at 37° C. Next day, two cultures of LB medium (500 mL) were inoculated with the overnight culture (10 mL). The inoculated cultures were grown at 37° C. and 220 rpm until the $OD_{595}$ was 1.2 (2.5-3 hours). IPTG was then added (final concentration of 1 mM) and induction was performed overnight at 25° C. Cells were harvested (3500 g, 15 min, 4° C.) and the pellet was suspended in suspension buffer (50 mL) [Tris-HCl pH 8 (50 mM), NaCl (300 mM), imidazole (1 mM)] and sonicated with use of four cycles (each consisting of 15 sec of sonication and 15 sec of rest) at an intensity of 50% and 0.5 pulses, the sample being kept on ice. After sonication, the sample was centrifuged (40 000 g, 30 min, 4° C.) and the supernatant was used immediately for POP purification. An ÄKTA explorer FPLC system was used for purification. The supernatant was applied at a flow of 1 mL/min to a HiTrapQuelating column (5 mL) previously equilibrated with 5 column volumes of suspension buffer. The column was washed with suspension buffer until the absorbance at 280 nm returned to basal level. The column was then rinsed with 5 volumes of washing buffer (50 mM Tris-HCl, pH 8, 300 mM NaCl, 30 mM imidazole). The elution was performed with 4 volumes of elution buffer (50 mM Tris-HCl, pH 8, 300 mM NaCl, 500 mM imidazole). Fractions (4 mL) were collected during the entire elution. POP activity was checked in all fractions and positive ones were analyzed by SDS-PAGE and stained with Biosafe Comassie Stain G-250. Positive fractions were collected and desalted by use of a HiPrep 26/10 Desalting column with Tris-HCl (50 mM, pH 8) as buffer. Recombinant hPOP was quantified with the Bio-Rad Protein Assay with BSA as standard. Aliquots of the recombinant enzyme were prepared and immediately frozen with liquid nitrogen and stored at −80° C.

POP Inhibition Assays

POP activity was determined following the method described by Toide et al (Toide K et al., *J. Pharmacol. Exp. Ther.* 1995; 274:1370-8), using Z-G-P-AMC (N-benzyloxycarbonyl-Gly-Pro-methylcoumarinyl-7-amide) as POP substrate. The reactions were performed in 96-well microtiter plates, which allowed simultaneous monitoring of multiple reactions. For each reaction, activity buffer (134 μl, 100 mM Na/K phosphate buffer, pH 8.0) was pre-incubated for 15 min at 37° C. with hPOP (ranging from 20 to 60 nM, depending on the activity of the hPOP batch) and the corresponding new compound solution (3 μl). A stock solution of new compound was prepared in DMSO (100 mM), and dilutions were prepared from this stock solution with DMSO.

After preincubation, Z-G-P-AMC (10 μl, 3 mM in 40% 1,4-dioxane) was added (3 μl, 1.5 mM in 40% of 1,4-dioxane, in Conditions B), and the reaction was incubated for 1 hour at 37° C. The reaction was stopped by adding sodium acetate (150 μl, 1 M, pH 4) and the formation of AMC was measured fluorimetrically. The excitation and emission wavelengths were 360/40 and 485/20 nm, respectively.

Several concentration points (ranging from 25 μM to 400 μM) were measured for each compound. The inhibitory activity on prolyl oligopeptidase was calculated according to eq 1. For each new compound, the fluorescence in the presence (a) and in the absence (b) of hPOP was measured.

The maximum fluorescence (0% inhibitory activity) was obtained from a sample of hPOP in the absence of inhibitory compounds. To estimate the inhibitory potency of the novel compound, activities were plotted against the log concentration of the compound, adjusting to a sigmoid curve using GraphPad Prism software, and the $IC_{50}$ value, defined as the concentration of compound required to inhibit 50% of POP activity, was determined from the resulting curve.

$$\text{Inhibitory activity (\%)} = \left[1 - \left(\frac{a-b}{c-d}\right)\right] \times 100 \quad \text{(Equation 1)}$$

wherein:
a corresponds to fluorescence intensity in the presence of substrate+tested compound+hPOP
b corresponds to the fluorescence intensity in the presence of substrate+tested compound
c corresponds to the fluorescence intensity in the presence of substrate+hPOP
d corresponds to the fluorescence intensity of the presence of substrate.

The new compounds exhibit high inhibition potency against human prolyl oligopeptidase. The results are summarized in Table 1.

TABLE 1

| Inhibition of human prolyl oligopeptidase. | | |
|---|---|---|
| Compound (Example no) | $IC_{50}$ (nM) | SD |
| Ex. 1 | 45.0 | 7.01 |
| Comp Ex. 3 | 48.7 | 20.3 |
| Comp Ex. 4 | 365.3 | 103.6 |

The data of Table 1 are represented in FIG. 1. In said figure bars represent the mean value±the standard deviation (SD).

DETERMINATION OF PERMEABILITY PROPERTIES OF THE COMPOUNDS

Parallel Artificial Membrane Permeability Assay (PAMPA)

Parallel artificial membrane permeability assay (PAMPA) described in Kansy M et al., *J. Med. Chem.* 1998; 41(7):1007-10 was used to determine the capacity of compounds to cross the Blood-Brain Barrier (BBB) by passive diffusion (Di L et al., *Eur. J. Med. Chem.* 2003; 38(3):223-32). The effective permeability ($P_e$) of the compounds was measured at an initial concentration of 200 µM. The buffer solution was prepared from a commercial concentrated one following the manufacturer's instructions. pH was adjusted to 7.4 using a 0.5 M NaOH solution. A stock solution of new compound was prepared in DMSO and diluted with buffer solution to a final 200 µM concentration (0.5% DMSO content). The PAMPA sandwich was separated and each donor well was filled with 200 µL of the compound solution. The acceptor plate was placed into the donor plate, ensuring that the underside of the membrane was in contact with buffer. 4 µL of the mixture of phospholipids (20 mg/mL) in dodecane was added to the filter of each well, and 200 µL of buffer solution was added to the each acceptor well. The plate was covered and incubated at room temperature in a saturated humidity atmosphere for 4 hours under orbital agitation at 100 rpm. After 4 hours, the contents of the acceptor and donor compartments were analyzed by HPLC: 150 µL of each well from the donor plate and 150 µL of each well from the acceptor plate were transferred to HPLC vials, injecting each sample into a reverse-phase C18 column (150 mm×4.6 mm×5 µm, 100 Å) (100 µL/injection from the acceptor wells, 10 µL/injection from the donor wells and for $t_0$ references). Transport was also confirmed by MALDI-TOF spectrometry.

The phospholipid mixture used was a porcine polar brain lipid extract, provided by Avanti polar lipids, with the following composition: 12.6% phosphatidylcholine (PC), 33.1% phosphatidylethanolamine (PE), 18.5% phosphatidylserine (PS), 4.1% phosphatidylinositol (PI), 0.8% phosphatidic acid and 30.9% of other compounds.

The effective permeability ($P_e$) after 4 hours was calculated using equation 2, the percentage of transport (T %) was calculated using equation 3 and the compound retention (R %) of the phospholipid membrane using equation 4:

$$P_e = \frac{-218.3}{t} \times \log\left[1 - \frac{2C_A(t)}{C_D(t_0)}\right] \times 10^{-6} \text{ cm/s} \quad \text{(Equation 2)}$$

$$T \% = \frac{C_A(t)}{C_D(t_0)} \times 100 \quad \text{(Equation 3)}$$

$$R \% = \left(1 - \frac{C_D(t) + C_A(t)}{C_D(t_0)}\right) \times 100 \quad \text{(Equation 4)}$$

wherein:
t is time (h)
$C_A(t)$ is the compound concentration in the acceptor well at time t, $C_D(t)$ is the compound concentration in donor well at time t
and $C_D(t_0)$ is the compound concentration in the donor well at $t_0$.

Based on the indicative Pe values shown in Table 2, the novel compounds show good permeability across the BBB (Table 3)

TABLE 2

| Indicative $P_e$ values | |
|---|---|
| Indicative $P_e$ values (cm/s) | Transport inside CNS |
| $P_e >= 4 \cdot 10^{-6}$ | Good |
| $2 \cdot 10^{-6} <= P_e < 4 \cdot 10^{-6}$ | Questionable |
| $P_e < 2 \cdot 10^{-6}$ | Bad |

TABLE 3

| Effective permeability ($P_e$) and percentage of transport of the new compounds | | | | | | |
|---|---|---|---|---|---|---|
| Compound (Example No) | Pe (×10⁻⁶ cm/s) | SD | % T | SD | % R | SD |
| 1 | 4.7 | 0.1 | 18.1 | 0.4 | 24 | 3.5 |
| Comp Ex. 3 | 22.14 | 5.86 | 29.92 | 4.80 | 10.93 | 1.60 |
| Comp Ex. 4 | — | — | 10.43 | 2.06 | — | — |

Figure 2:
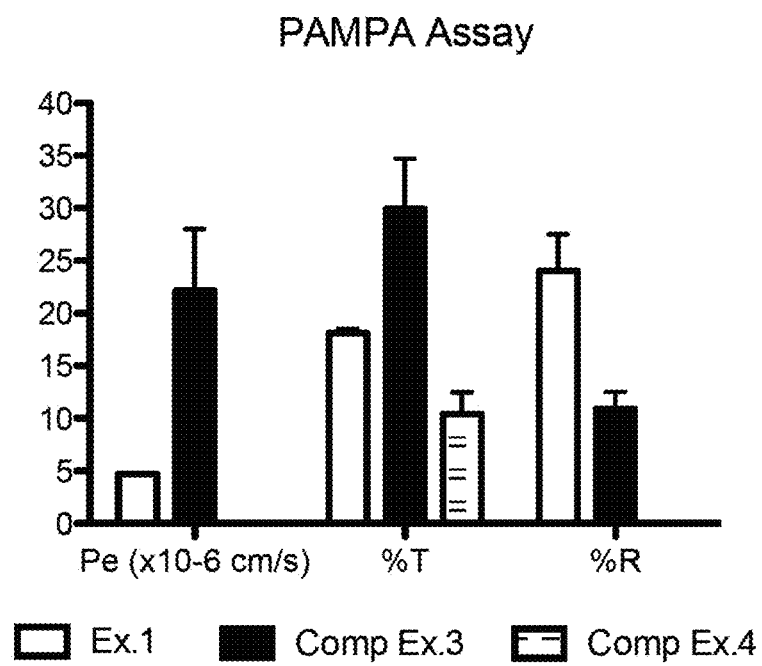
FIG. 2 shows the results of the PAMPA assay for the compounds of example 1, comparative example 3 and comparative example 4.

The data of Table 3 are represented in FIG. 2. In said figure bars represent the mean value±the standard deviation (SD).

Caco-2 Assay

Caco-2 cells are widely used as an in vitro model for predicting human drug absorption. The Caco-2 cell line is derived from human colorectal carcinoma, and when cultured, the cells spontaneously differentiate into monolayers of polarized enterocytes.

Drug permeability across monolayers of Caco-2 cells has been shown to correlate well with in vivo absorption in man (Zhao Y H et al., 2001, *J. Pharmaceut. Sci.* 90:749-784) and has become a well-established in vitro method for the prediction of intestinal absorption (Kansy M et al., 2001, *Pharmcacokinetic optimization in drug research*, Ed. Testa B et al., 447-646).

Experiments were done using the CacoReay permeability kit (ReadyCell, Barcelona, Spain).

On the same week of the reception of the kit, the shipping medium of the cells was liquefied according to user's manual provided with the kit, after which the shipping medium was replaced with fresh Dulbecco's Modified Eagle's Medium (DMEM, low-glucose).

Three days later, equivalent to day 20 of cell culture, the quality of the barrier system and the presence of tight junctions between the cells was checked by measuring the trans endothelial electrical resistance (TEER) of the cell barrier. A TEER value of 200 $\Omega \cdot cm^2$ (or higher) indicates that the barrier system is acceptable for an absorption assay. The electrodes were sterilized by submerging them in ethanol (70%) for 30 min under UV light. Afterwards, the electrode was equilibrated for 30 min in DMEM medium, pre-warmed at room temperature. The TEER measures were performed at room temperature obtaining a mean value of $1357 \pm 168$ $\Omega \cdot cm^2$, confirming the integrity of the cellular barrier.

Previous to the permeability assay, the transport buffer was prepared (HBSS (1×)-$Ca^{2+}$/$Mg^{2+}$) and warmed to 37° C. in order to avoid cell temperature stress during the experiment. In parallel the compounds to be tested were dissolved to at a final concentration 50 μM in transport buffer (HBSS (1×)-$Ca^{2+}$/$Mg^{2+}$). Containing a 0.5% of DMSO, an amount which is well tolerated by the cells and does not affect the barrier integrity. Compounds were tested at a concentration of 50 μM.

Before the permeability assay, the DMEM of the apical and basal compartments was removed by suction. A volume of 10 μL of medium was left in each compartment in order to prevent the cells from drying and damaging their barrier properties. Both compartments were rinsed with transport buffer, the basal (bottom) compartment was filled with 300 μL and the apical (top) compartment with 75 μL of transport buffer.

The content of the basal compartment was completely removed by suction and filled again with 250 μL of the transport buffer. The content of the apical compartment was also removed by suction, leaving 10 μL of the transport buffer in order to avoid the cells from drying. 65 μL of the compound solution to be tested was added to each well.

For the transport experiments (apical to basal), the cells were incubated with the solutions containing the compounds for 2 hours at 37° C. Afterwards, the content of the compartments was recovered and analyzed by HPLC (Column C18 Sunfire 100 mm×4.6 mm, 3.5 mm, 100 Å, Waters; Flow rate 1 mL/min; Gradient 0-100% B in 8 min A=0.045% Trifluoroacetic acid in $H_2O$ and B 0.036% Trifluoroacetic acid in acetonitrile, detection at 220 nm). All the experiments were performed by triplicate.

After removing the samples from the compartments, in order to check the integrity of the cell barriers during the assays, the basal compartments were filled again with 250 μL of transport buffer, and the apical compartments with 65 μL of a Lucifer Yellow (LY) solution at a concentration 20 μM in transport buffer. The cell barrier was incubated for 1 hour at 37° C. with the LY solution. LY is used as a barrier integrity marker for permeability assays. After incubation, the content of the compartments was collected and analyzed using a fluorimeter.

For a fully functional Caco-2 barrier, the permeability of LY should be less than 0.7% after 1 hour. After the assay, LY permeability was below this transport average, which indicates barrier integrity of the barrier during the evaluation of the compounds.

In the Caco-2 permeability assay, the percentage of transport (T %) for the compounds was calculated according to the following equation:

$$T \% = \frac{C_A(t)}{C_D(t_0)} \times 100$$

where t is time (hour), $C_A(t)$ is the compound concentration in the basal compartment (acceptor) at time t, $C_D(t_0)$ is the compound concertation in the apical compartment (donor) at time 0.

TABLE 4

| Permeability (Caco-2 assay) | | |
|---|---|---|
| Compound (Example No) | % T | SD |
| 1 | 45 | 3 |
| Comp Ex. 3 | 5.7 | 1 |

As shown above, the gastric permeability of compound of example 1 is much higher than that of comparative example 3. In said figure bars represent the mean value±the standard deviation (SD).

Figure 3:
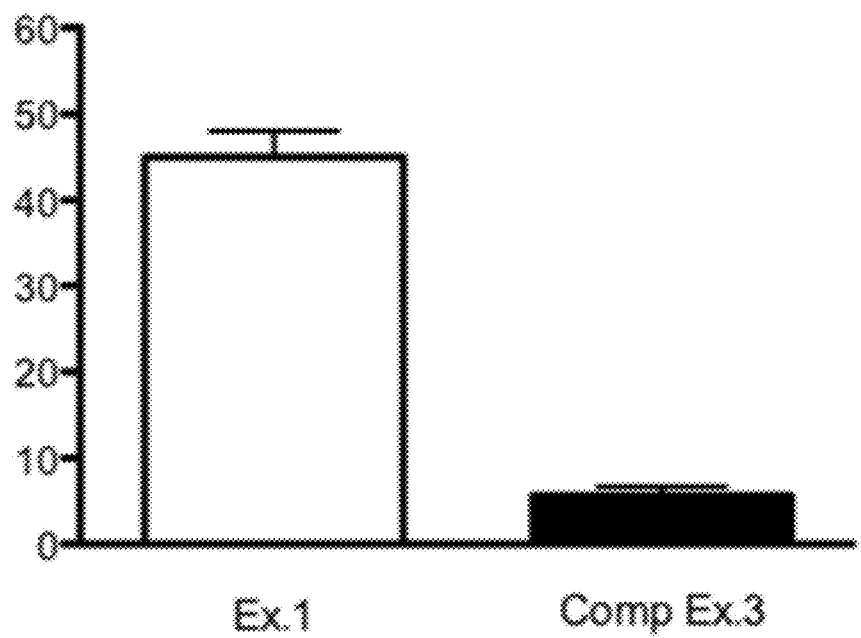
FIG. 3 shows the results of the Caco-2 assay for the compounds of example 1 and comparative example 3.

The data of Table 4 are represented in FIG. 3.

In Vivo Brain Exposure

For each compound, twenty-four adult male mice, aged 7-8 weeks on the day of experiment, were used for the study and were allocated randomly between the groups. The experiments were performed on 3 groups of animals as described in the table below:

| Group | Treatment, route/dose, volume of administration | Mice per group | Plasma and brain samples times |
|---|---|---|---|
| 1 | No treatment (control group) | N = 3 | Pre-dose |
| 2 | Comp. Ex 3, IP, 5 mg/kg, 10 mL/kg | N = 21 (3 animals for each sampling time) | T 0 + 5 min, T0 + 30 min, T 0 + 1 h, T 0 + 2 h, T 0 + 4 h, T 0 + 7 h, T 0 + 24 h |
| 3 | Ex. 1, PO, 5 mg/kg, 10 mL/kg | N = 21 (3 animals for each sampling time) | T 0 + 5 min, T 0 + 30 min, T 0 + 1 h, T 0 + 2 h, T 0 + 4 h, T 0 + 7 h, T0 + 24 h | mg, milligram;
mL, milliliter;
h, hour;
kg, kilogram;
min, minute;
N, number of animals;
IP, intraperitoneal;
PO, per os;
T, time;
min, minute After compound administration, terminal blood was performed at several time points after intraperitoneal (Comp. ex. 3) or oral administration (Ex. 1).

After transcardiac perfusion with phosphate buffered saline, brains were also collected. All the samples were stored at −80° C. until bioanalysis.

The plasma samples were thawed at room temperature (RT), and the samples were protein precipitated with a 2-fold volume of acetonitrile, containing 20 ng/mL phenacetin as an internal standard. The samples were mixed throughout, followed by centrifugation for 20 min at 2,200×g. The supernatants were diluted 1:1 with 150 mM phosphate buffered saline (pH 7.4) and pipetted onto UPLC 96-well plates to wait for the analysis.

The brain samples were weighted, thawed at RT, and were prepared for analysis by homogenising the tissue in a bead homogeniser with a 4-fold volume of phosphate buffered saline. The homogenate was treated similarly to plasma samples.

Reference (calibration) samples were prepared similarly as actual study samples, after spiking blank plasma and brain homogenate to 0.1, 0.2, 0.5, 1, 2, 5, 10, 20, 50, 100, 200, 500, 1000, 2000, 5000 and 10000 ng/mL concentrations of example 1 and Comp. Ex. 3. The quality control samples were prepared similarly as the actual study samples, after spiking blank plasma and brain homogenate to 20, 200 and 2000 ng/mL of example 1 or Comp. Ex. 3.

Levels of the compounds of Comp. Ex. 3 and example 1 were quantified from mouse plasma and brain. Samples were analyzed using a fit-on-purpose bioanalytical method using a UPLC/QE-Orbitrap-Mass Spectroscopy.

The concentration (ng/mL) of the compounds along time was plotted and the area under the curve (AUC) in plasma and brain tissue was calculated using Graphpad Prism™ 5.0. The plasma to brain ratio was calculated as follows:

$$\% \, BBB \, crossing = \frac{AUCbrain}{AUCplasma} \times 100$$

TABLE 5

| Brain exposure | |
| --- | --- |
| Compound (Example No) | % BBB |
| 1 | 25.3 |
| Comp Ex. 3 | 21 |

Figure 4:
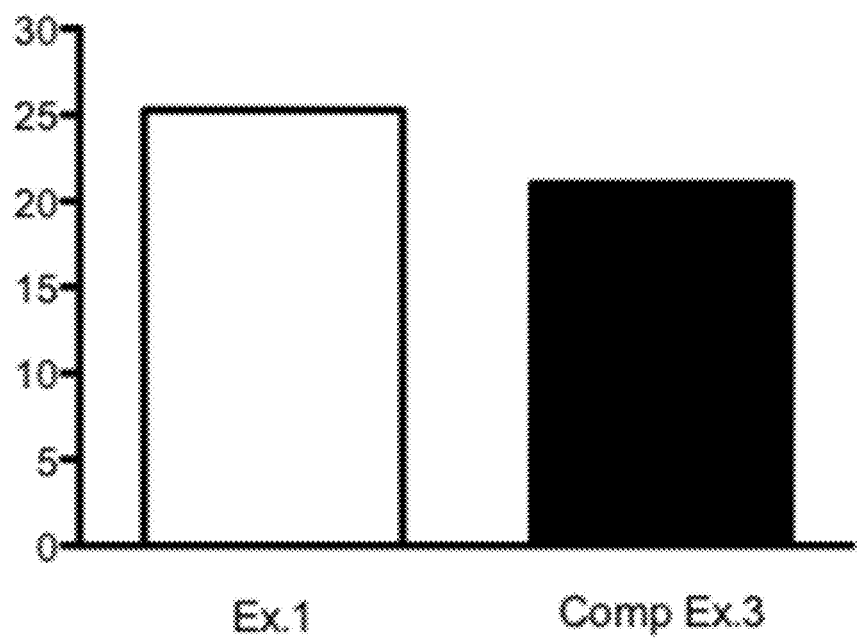
FIG. 4 shows the results of the vivo brain exposure assay for the compounds of example 1 and comparative example 3.

The data of Table 5 are represented in FIG. 4.

As shown above when using compound of example 1 by oral administration it is possible to achieve higher brain exposure than the one achieved by other compounds even when said compounds are administered intraperitoneally.

Microsomal Stability (Rat)

Microsomal stability is useful to predict if a compound will overcome the first pass of metabolism and reach systemic exposure after oral administration. It is also useful to predict compound half-life once in the blood stream.

The stability of the compounds in rat (Sprague-Dawley) pooled liver microsomes (catalog number 452501) was investigated according to the instructions provided by the vendor (BD Bioscience). A stock solution (500 µM) of the compound to be tested was prepared in DMSO. Two µL of the compounds were incubated at 1 µM final concentration in a mixture of:

713 µL of $H_2O$
200 µL of 0.5 M potassium phosphate (pH 7.4)
50 µL of NADPH regenerating system solution A (BD Bioscience, catalog number 451220)
10 µL of NADPH regenerating system solution B (BD Bioscience, catalog number 451200)

The resulting mixture was warmed to 37° C. for 5 min. After which, 25 µL of liver microsomes were added at a final concentration of 0.5 mg/mL. The mixture was incubated at 37° C. with orbital agitation (100 rpm). At selected time points, 100 µL aliquots were extracted and mixed with 100 µL of acetonitrile. The obtained precipitate was shake in a vortex for 1 minute. Samples were kept at 4° C. for 30 min, after which, samples were centrifuged at 20,000×g at 4° C. for 30 min. The supernatant was filtered out and subsequently analysed by UPLC-MS. All stability tests were performed in duplicates.

TABLE 6

| Microsomal stability (rat) | |
| --- | --- |
| Compound (Example no) | Half-life (min) |
| Ex. 1 | 12 |
| Comp Ex. 3 | <5 |
| Comp Ex. 4 | <5 |

These data suggest that Comparative Example 3 and Comparative Example 4 will not overcome the first pass of metabolism after the oral administration. Hence, will not reach systemic circulation after oral administration. Indeed, Comparative Example 3 showed no efficacy after oral administration, being the detected plasma levels of the drug very low.

PK in Mice

The pharmacokinetics of the compounds following intravenous bolus administration was conducted in male Swiss Albino mice. The study was conducted in accordance with the guidelines of the Institutional Animal Ethics Committee (IAEC) and in accordance with the requirements of Committee for the Purpose of Control and Supervision of Experiments on Animals (CPCSEA), India.

Study was conducted in 12 mice per compound using sparse sampling design (n=3/time point) to produce composite profile. The compounds were dissolved in 2% Twee80® in saline (0.9 NaCl) at a concentration of 0.5 mg/mL. Mice were administered a single dose of 1 mg/kg of the compound solution by intravenous bolus through lateral tail vein using 1 mL BD syringe guided with 26G needle at a dose volume of 2 mL/kg.

Blood samples were collected (n=3 per time point) at 0.083, 0.25, 0.5, 1, 2, 4, 6, 8, 24 and 48 h post-dose. At each time point, 120 µL of blood was collected by retro orbital plexus puncture and transferred into a labeled microfuge tube containing 200 mM $K_2EDTA$ solution (20 µL per mL of blood). The blood samples were centrifuged at 5000×g for 5 min at 4±2° C. Plasma samples were stored below −60° C. until bioanalysis.

Plasma samples were analyzed using a LC-MS/MS method with LLOQ of 1.06 ng/mL. Pharmacokinetic parameters in plasma were calculated using the non-compartmental analysis tool of the validated Phoenix WinNonlin® software (version 6.3). The area under the concentration time curve (AUC$_{last}$) was calculated by linear trapezoidal rule. Peak plasma concentration (C$_{max}$) and time to reach the peak plasma concentration (Tmax) were the observed values. Clearance (CL) and volume of distribution (Vss) were predicted values.

TABLE 7

Pharmacokinetics (mice)

| Compound (Example No) | AUClast (ng · h/mL) | CL (mL/min/kg) | Vss (L/kg) |
|---|---|---|---|
| 1 | 127 | 99.6 | 1.19 |
| Comp Ex. 3 | 131 | 126 | 0.64 |
| Comp Ex. 4 | 22.7 | 697 | 9.06 |

Comparative Example 4 shows a very high clearance after intravenous (iv) administration in mice, which indicates that the compound suffers a high first pass of metabolism (in agreement with the microsomal stability data), suggesting that the compound will not reach systemic circulation after oral administration.

EFFECT OF THE NEW COMPOUNDS ON LEARNING AND MEMORY IN A COGNITION IMPAIRMENT ANIMAL MODEL

The new compounds were evaluated for their efficacy as cognition enhancers in a pharmacological model for cognitive impairment. The effects of the new compounds were evaluated in untreated and MK-801-treated rodents (mice or rats). MK-801 is a non-competitive antagonist of the N-Methyl-D-aspartate (NMDA) receptor which impairs animal performance in various learning and memory paradigms (Castellano C et al., Curr. Drug Targets 2001; 2:273-83.; Riedel G et al., Behav. Brain Res. 2003; 140:1-47). MK-801 also produces various effects on rodent behavior, including deficits in sensory processing, hypermotility, stereotypy and ataxia. The behavioral phenotype induced by MK-801 treatment has been widely used as animal model of cognitive deficits (Bardgett M E et al., Brain Res. Bull. 2003; 60:131-42; Van der Staay F J et al., Behav. Brain Res. 2011; 220:215-29; Mutlu O et al., Pharmacol. Biochem. Behav. 2011; 99:557-65).

In order to determine whether the tested compounds act as cognitive enhancer, their ability to restore normal cognitive behavior was tested through widely used tests such as the novel object recognition test (Dere E et al., Neurosci. Biobehav. Rev. 2007; 31:673-704; Boess F G et al., J. Pharmacol. Exp. Ther. 2007; 321:716-25); the passive or inhibitory avoidance task (Sarter M et al., Psychopharmacology (Berl) 1992; 107:144-59); the Morris water maze (D'Hooge R et al., Brain Res. Rev. 2001; 36:60-90); and the T-maze alternation task (Boess F G et al., Neuropharmacology 2004; 47:1081-92; Spowart-Manning L et al., Behav. Brain Res. 2004; 151:37-46).

As a representative example for the evaluation of the new POP inhibitors, the protocol followed for each of the behavioral tests, as well as the results obtained in the object recognition test and the passive avoidance test are described.

Novel Object Recognition Task

The novel object recognition (NOR) task is based on the natural preference of rodents to explore novel objects (Ennaceur A et al., Behav. Brain Res. 1988; 31:47-59). It is a relevant non-rewarded test for studying visual learning and memory deficits. Briefly, the NOR task procedure consisted of three trials: habituation, training and retention. Each animal was habituated to a 40-cm diameter circular arena for 10 min in the absence of objects (habituation session). The following day, the animal was placed for 10 min in the circular arena for the training trial, and two identical objects were placed in a symmetrical position. This step was done for two consecutive days. On the third day, one of the objects was replaced by a different object. The object not used in the training trial was used as the novel object in the retention trial. The animals were then allowed to explore freely for 10 min, and the time spent exploring each object was recorded. The animal is expected to spend more time exploring the novel object, which is a sign of intact recognition memory. An index of discrimination was calculated as follows: time spent exploring the new object minus time spent exploring the old object, divided by the total time exploring both objects, and multiplied by 100. A higher index of discrimination was considered to reflect greater memory retention.

Compounds Administered by Oral Route

The experiment was performed using male C57/Bl6 mice 8-9 weeks old (n=7-9 animals per group). Compounds were dissolved with a mixture of 5% of Tween80® in saline (0.9% NaCl) to obtain a solution strength of 0.5 mg/mL.

The test was divided into three parts: habituation, training, and test. On the first day, animals were habituated to the arena (circular, 40 cm in diameter) for 10 minutes. On the next two days, animals were allowed to freely explore two identical objects placed in the arena for 10 minutes. In test sessions (forth day), one of the objects was replaced by a novel one. Before this session, thirty-five minutes before the test, animals were administered per os (po) with the compounds under study (5% Tween80® in saline, 5 mg/kg) or vehicle (5% Tween80® in saline, 1 mL per 100 g body weight). To induce cognitive deficits, Dizocilpine (MK-801) was administered subcutaneously at 0.2 mg/kg dose in saline 20 min before the test to the negative control group or to the drug testing groups. Baseline control group was injected with saline.

After drug administration, each mouse was allowed to freely explore the objects for 10 minutes. The discrimination index (DI) was defined as the parameter for evaluation:

$$\% \, DI = \left( \frac{\text{time devoted to new object minus time devoted to familiar object}}{\text{time devoted to new object plus time devoted to familiar object}} \right) \times 100$$

The experiment was recorded using a webcam placed 1.5 m above the arena. The traveled distance by the mice as the percentage of time expended in the areas of the circular arena was analyze using Panlab SMART 2.0 software.

Compounds Administered by Intraperitoneal Route

The experiment was performed using male C57/Bl6 mice 8-9 weeks old (n=7-9 animals per group). Compounds were dissolved with a mixture of 5% of Tween80® in saline (0.9% NaCl) to obtain a solution strength of 0.5 mg/mL.

The test was divided into three parts: habituation, training, and test. On the first day, animals were habituated to the arena (circular, 40 cm in diameter) for 10 minutes. On the next two days, animals were allowed to freely explore two identical objects placed in the arena for 10 minutes. In test sessions (forth day), one of the objects was replaced by a novel one. Before this session, thirty-five minutes before the test, animals were administered intraperitoneally with the compounds under study (5% Tween80® in saline, 5 mg/kg) or vehicle (5% Tween80® in saline, 1 mL per 100 g body weight). To induce cognitive deficits, Dizocilpine (MK-801) was administered subcutaneously at 0.2 mg/kg dose in saline 20 min before the test to the negative control group or to the drug testing groups. Baseline control group was injected with saline.

After drug administration, each mouse was allowed to freely explore the objects for 10 minutes. The discrimination index (DI) was defined as the parameter for evaluation:

$$\% DI = \left(\frac{\text{time devoted to new object minus time devoted to familiar object}}{\text{time devoted to new object plus time devoted to familiar object}}\right) \times 100$$

The experiment was recorded using a webcam placed 1.5 m above the arena. The traveled distance by the mice as the percentage of time expended in the areas of the circular arena was analyze using Panlab SMART 2.0 software.

The results obtained when administering the compound of Example 1 and that of Comparative example 3 are provided in the table below.

TABLE 8

NOR task test

| | Compound | % discrimination index |
|---|---|---|
| Intraperitoneal | Control | 39.5 ± 3.9** |
| | MK 801 (sc) | 21 ± 4.7 |
| | MK 801 (sc) + Ex. 1 (ip) | 30.3 ± 3.9 |
| | MK 801 (sc) + Comp. Ex. 3 (ip) | 42.7 ± 3.3*** |
| Oral | Control | 53.3 ± 2.7*** |
| | MK 801 (sc) | 16.6 ± 5.9 |
| | MK 801 (sc) + Ex. 1 (po) | 42.1 ± 5.1** |
| | MK 801 (sc) + Comp. Ex. 3 (po) | 20.1 ± 2.9 |

Figure 5A:
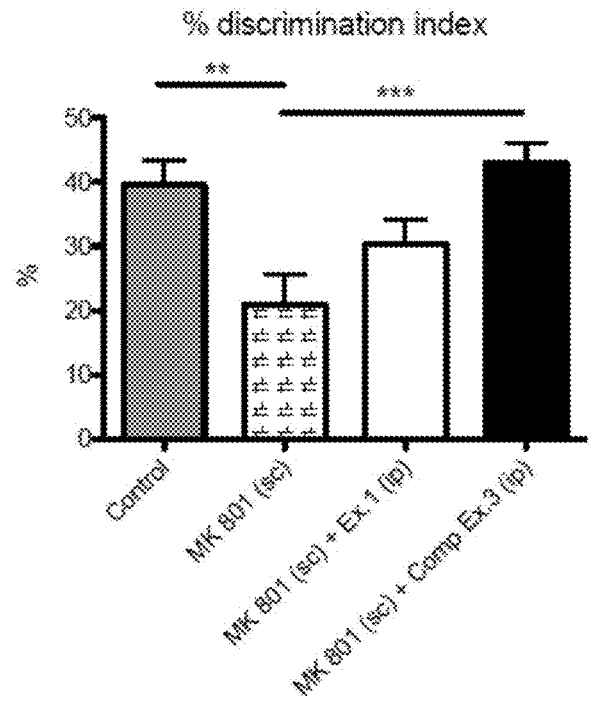
FIGS. 5a and 5b show the results of the NOR task assay for the compounds of example 1 and comparative example 3.
Figure 5B:
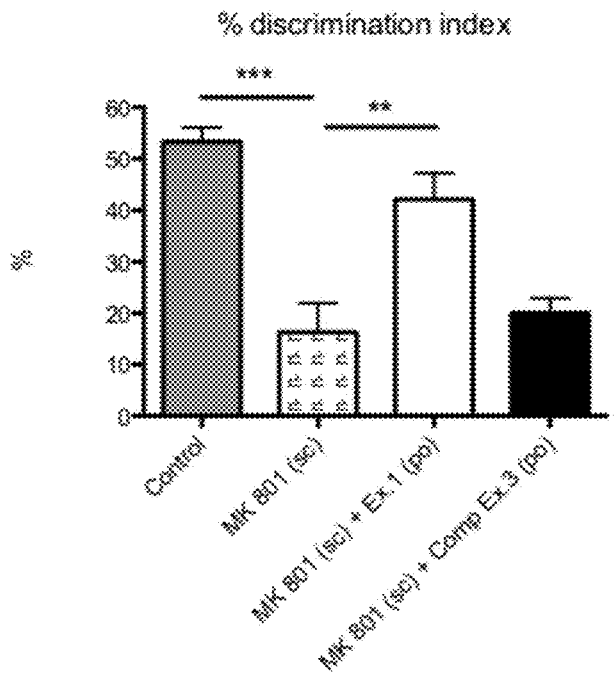

The data of Table 8 are represented in FIG. 5a (intraperitoneal administrarion) and FIG. 5b. (oral administration). In said figures bars respresent mean ± s.e.m. of n animals.
*P < 0.05,
**P < 0.01,
***P < 0.001 vs. basal (basal MK 801) conditions of cognitive deficit (one-way ANOVA test followed by Dunnett's post-hoc test).

As shown above, compound of example 1 is superior to comparative example 3 when it is administered by oral route making it particularly suitable for oral administration.

Selectivity Profile (Binding to 5-HT1A)

The experiment was performed using the Safety-Screen44® panel from Cerep/Eurofins. Compounds were tested at a concentration 100 µM (in 1% DSMO).

Compound binding was calculated as a percentage inhibition of the binding of a radioactively labeled ligand specific for each target.

The results are expressed as a percent inhibition of control specific binding $$100 - \left(\frac{\text{measured specific binding}}{\text{control specific binding}} \times 100\right)$$

obtained in the presence of tested compounds.

Results showing an inhibition higher than 50% are considered to represent significant effects of the test compounds.

TABLE 9

Binding to 5-HT1A receptor

| Compound | % inhibition of control specific binding | SD |
|---|---|---|
| Ex. 1 | −6.3 | 1.2 |
| Comp. Ex. 3 | 64.6 | 5.6 |

Figure 6:
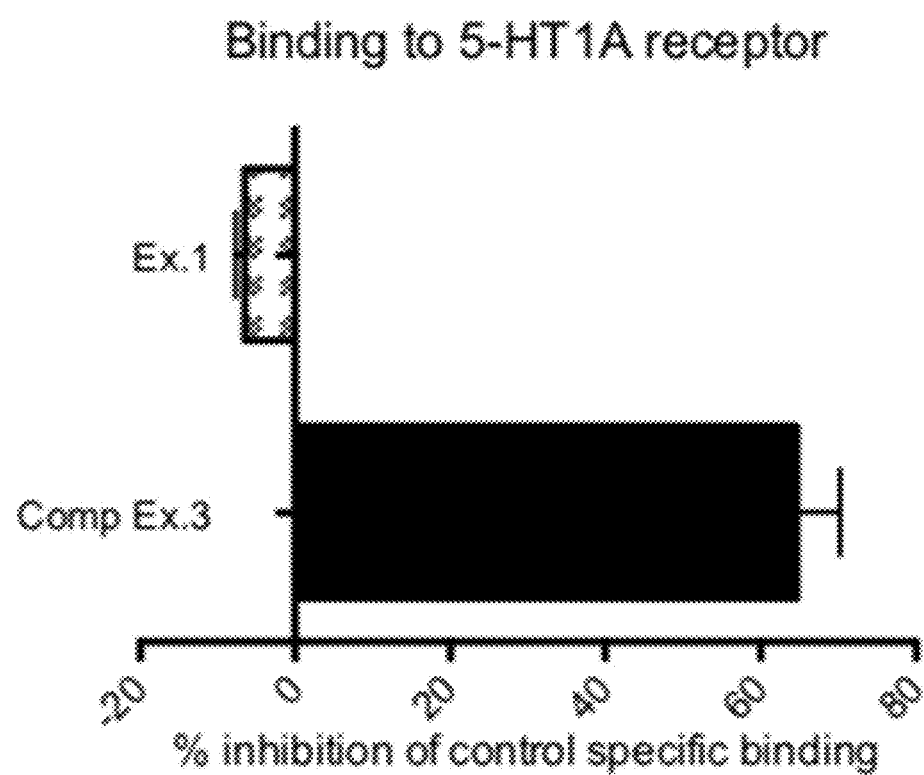
FIG. 6 shows the results of the binding to the 5-HT1A receptor for the compounds of example 1 and comparative example 3.
Figure 7:
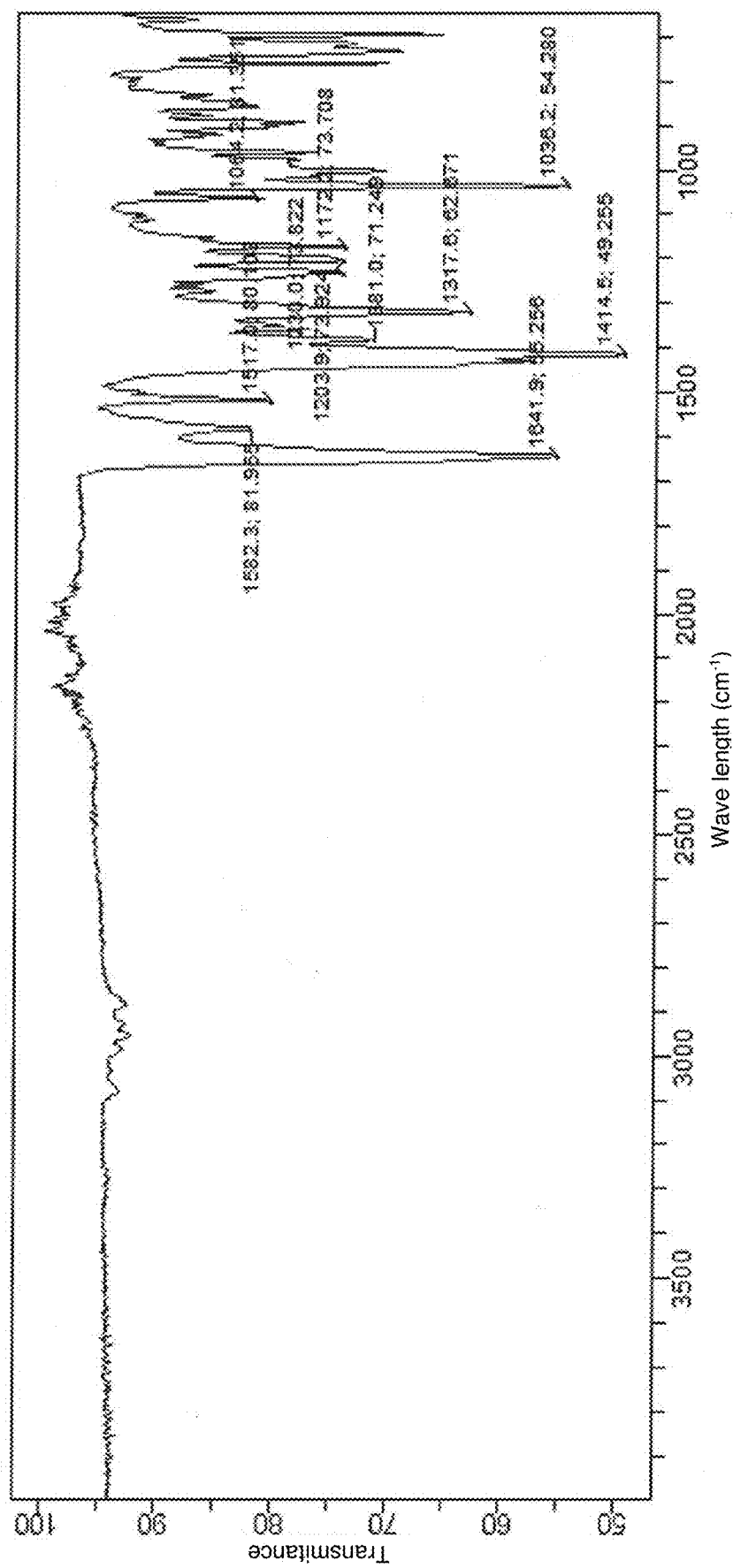
FIG. 7 shows the IR spectrum of (S)-1-((2S,4R)-1-(4-(benzyloxy)-3,5-difluorobenzoyl)-4-fluoropyrrolidine-2-carbonyl)pyrrolidine-2-carbonitrile.
Figure 8:
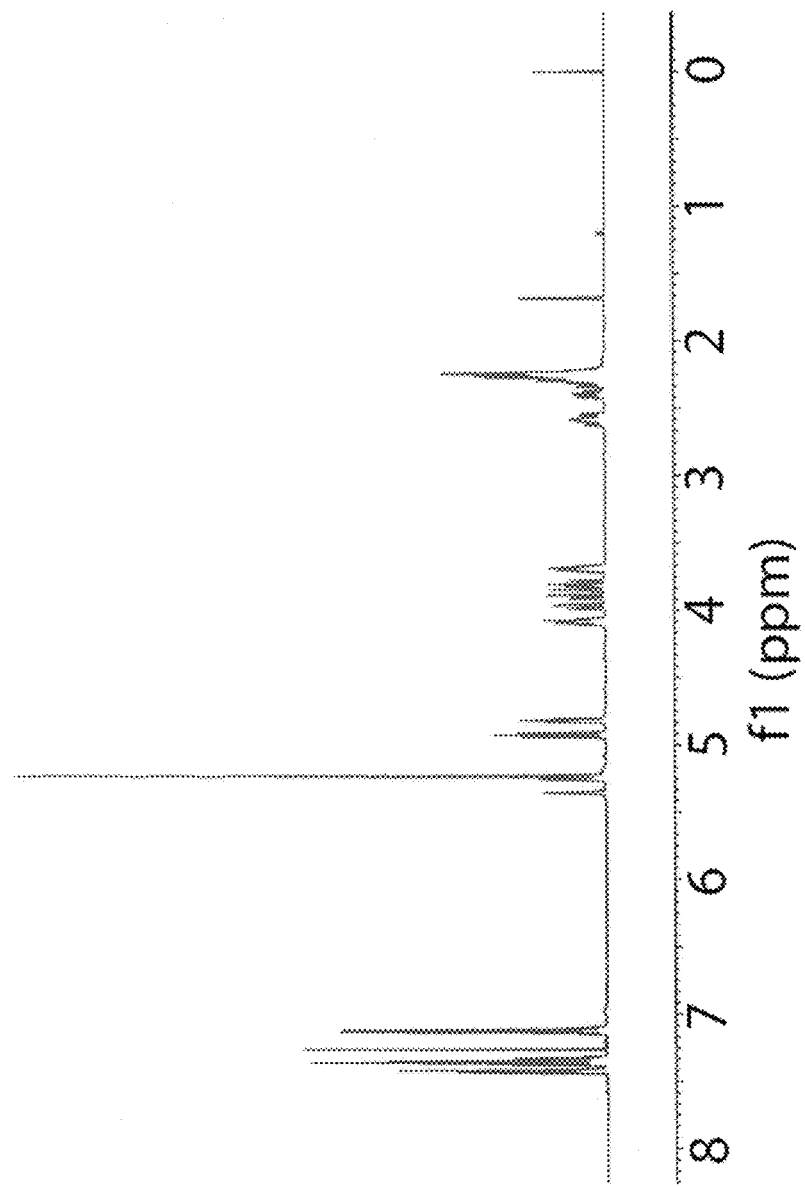
FIG. 8 shows the $^1$H-NMR spectrum of (S)-1-((2S,4R)-1-(4-(benzyloxy)-3,5-difluorobenzoyl)-4-fluoropyrrolidine-2-carbonyl)pyrrolidine-2-carbonitrile.
Figure 9:
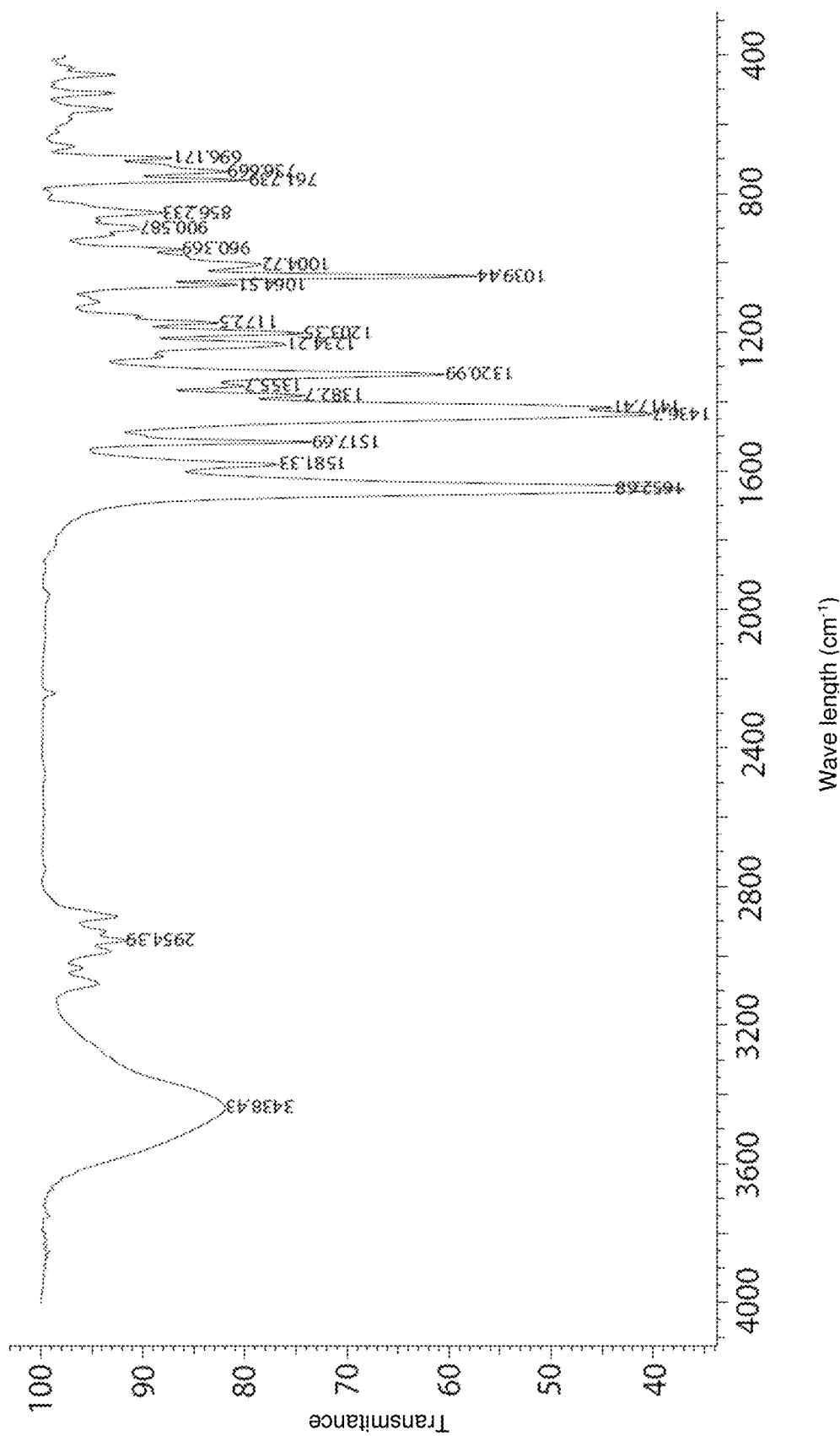
FIG. 9 shows the IR spectrum of (S)-1-((2S,4S)-1-(4-(benzyloxy)-3,5-difluorobenzoyl)-4-fluoropyrrolidine-2-carbonyl)pyrrolidine-2-carbonitrile.
Figure 10:
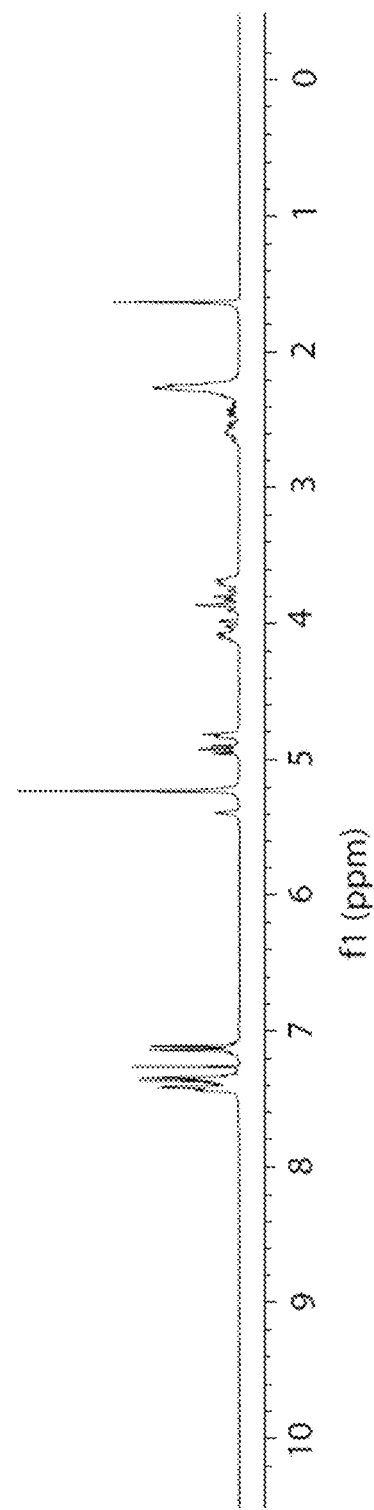
FIG. 10 shows the $^1$H-NMR spectrum of (S)-1-((2S,4S)-1-(4-(benzyloxy)-3,5-difluorobenzoyl)-4-fluoropyrrolidine-2-carbonyl)pyrrolidine-2-carbonitrile.

The data of Table 9 are represented in FIG. 6.

What is claimed is:

1. A compound of the formula (I):

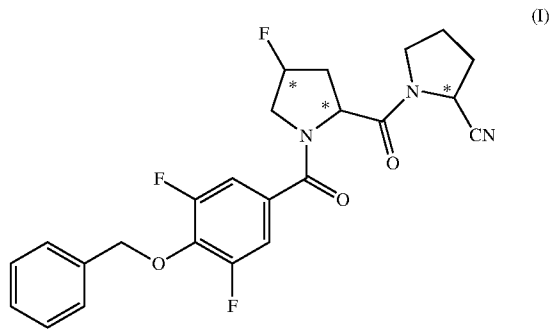 [SMILES: N#CC1CCCN1C(=O)C1CC(F)CN1C(=O)c1cc(F)c(OCc2ccccc2)c(F)c1]

(wherein the asterisks denote chiral centers), its stereoisomers and salts thereof.

2. The compound according to claim 1 having formula (Ia):

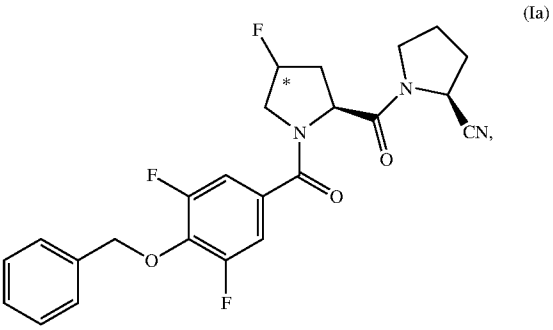 [SMILES: N#C[C@@H]1CCCN1C(=O)[C@@H]1CC(F)CN1C(=O)c1cc(F)c(OCc2ccccc2)c(F)c1]

its stereoisomers and salts thereof.

3. The compound according to claim 1, wherein said compound is selected from the group consisting of:
   (S)-1-((2S,4R)-1-(4-(benzyloxy)-3,5-difluorobenzoyl)-4-fluoropyrrolidine-2-carbonyl)pyrrolidine-2-carbonitrile
   (R)-1-((2S,4R)-1-(4-(benzyloxy)-3,5-difluorobenzoyl)-4-fluoropyrrolidine-2-carbonyl)pyrrolidine-2-carbonitrile
   (S)-1-((2R,4R)-1-(4-(benzyloxy)-3,5-difluorobenzoyl)-4-fluoropyrrolidine-2-carbonyl)pyrrolidine-2carbonitrile
   (R)-1-((2R,4R)-1-(4-(benzyloxy)-3,5-difluorobenzoyl)-4-fluoropyrrolidine-2-carbonyl)pyrrolidine-2-carbonitrile (S)-1-((2S,4S)-1-(4-(benzyloxy)-3,5-difluorobenzoyl)-4-fluoropyrrolidine-2-carbonyl)pyrrolidine-2-carbonitrile (R)-1-((2S,4S)-1-(4-(benzyloxy)-3,5-difluorobenzoyl)-4-fluoropyrrolidine-2-carbonyl)pyrrolidine-2-carbonitrile (S)-1-((2R,4S)-1-(4-(benzyloxy)-3,5-difluorobenzoyl)-4-fluoropyrrolidine-2-carbonyl)pyrrolidine-2-carbonitrile (R)-1-((2R,4S)-1-(4-(benzyloxy)-3,5-difluorobenzoyl)-4-fluoropyrrolidine-2-carbonyl)pyrrolidine-2-carbonitrile, and salts thereof.

4. A process for preparation of the compound of formula (I) as defined in claim 1, which comprises:

a) reacting a compound of formula (IX):

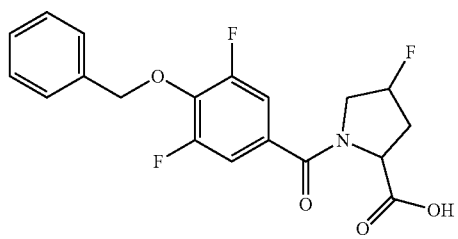

(IX)

with a compound of formula (XI):

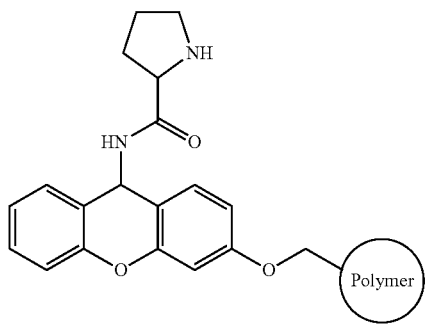

(XI)

to yield a compound of formula (XII):

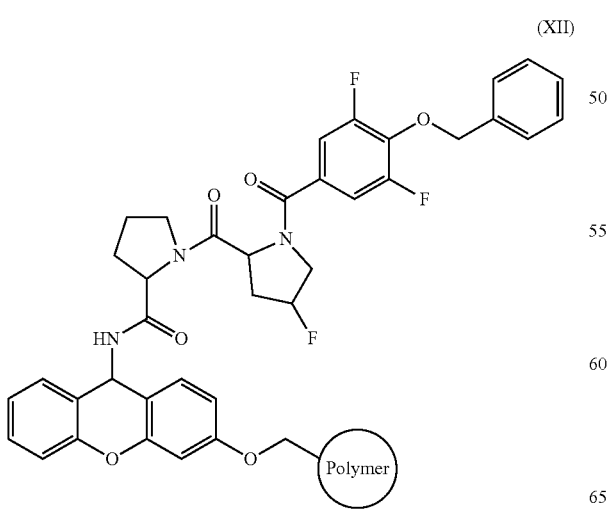

(XII)

b) hydrolyzing the compound of formula (XII) to yield the compound of formula (XIV):

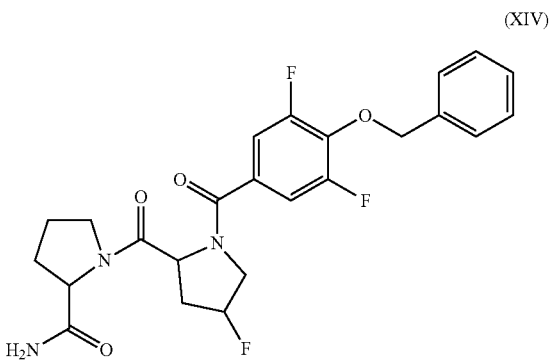 [SMILES: NC(=O)C1CCCN1C(=O)C1CC(F)CN1C(=O)c1cc(F)c(OCc2ccccc2)c(F)c1]

(XIV)

and c) subjecting the compound of formula (XIV) to conditions capable of transforming a carboxamide group into a nitrile group to yield the compound of formula (I):

wherein said b) and c) may be performed separately or in a one pot reaction.

5. A process for the preparation of the compound of formula (I) as defined in claim 1, its stereoisomers and salts thereof, which comprises reacting a compound of formula (IX):

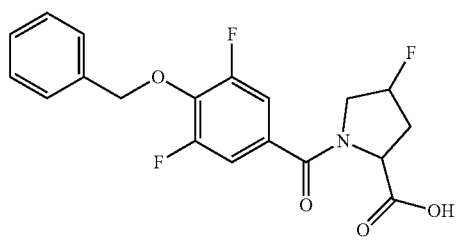

(IX)

with a compound of formula (IV):

(IV)

6. A pharmaceutical composition comprising the compound of formula (I) as defined in claim 1, its stereoisomers and pharmaceutically acceptable salts thereof and a pharmaceutically acceptable carrier, adjuvant or vehicle.

7. A method for treatment of a cognitive disorder in a mammal, wherein a therapeutic amount of the compound as defined in claim 1 is administered to a patient in need of said treatment, wherein the cognitive disorder is a cognitive disorder associated with a disease selected from the group consisting of schizophrenia, major depressive disorder, bipolar affective disorder, REM sleep behavior disorder, Alzheimer's disease, frontotemporal dementia, Parkinson's disease, Lewy body disease, multiple systems atrophy, progressive supranuclear palsy, cortico-basal degeneration or amyotrophic lateral sclerosis.

8. The method according to claim 7, wherein the therapeutic amount of the compound is administered orally to the patient.

\* \* \* \* \*